(12) United States Patent
Harman

(10) Patent No.: US 7,576,648 B2
(45) Date of Patent: Aug. 18, 2009

(54) CABLE GUIDED INTRUSION DETECTION SENSOR, SYSTEM AND METHOD

(75) Inventor: Robert Keith Harman, Almonte (CA)

(73) Assignee: Senstar-Stellar Corporation, Carp, Ontario (CA)

( * ) Notice: Subject to any disclaimer, the term of this patent is extended or adjusted under 35 U.S.C. 154(b) by 620 days.

(21) Appl. No.: 10/566,895

(22) PCT Filed: Aug. 2, 2004

(86) PCT No.: PCT/CA2004/001438

§ 371 (c)(1),
(2), (4) Date: Feb. 1, 2006

(87) PCT Pub. No.: WO2005/013223

PCT Pub. Date: Feb. 10, 2005

(65) Prior Publication Data

US 2008/0036597 A1 Feb. 14, 2008

Related U.S. Application Data

(60) Provisional application No. 60/491,548, filed on Aug. 1, 2003.

(51) Int. Cl.
*G08B 13/18* (2006.01)
(52) U.S. Cl. .................. 340/552; 340/561; 340/566
(58) Field of Classification Search ............... 340/561, 340/566, 552, 550, 564, 554, 541, 567, 545.3, 340/565; 324/600, 671, 54
See application file for complete search history.

(56) References Cited

U.S. PATENT DOCUMENTS 4,091,367 A 5/1978 Harman (Continued)

FOREIGN PATENT DOCUMENTS

| CA | 1169939 | 6/1984 |
|---|---|---|
| CA | 1014245 | 7/2002 |

OTHER PUBLICATIONS

Fan P, Darnell M., "Sequence Design for Communications Applications", John Wiley & Sons: New York, 1996, p. 311 and Appendix A.

(Continued)

*Primary Examiner*—Davetta W Goins
*Assistant Examiner*—Hoi C Lau
(74) *Attorney, Agent, or Firm*—Volpe and Koenig, PC

(57) ABSTRACT

The present invention provides an intrusion detecting system and method for precisely locating an intruder along the length of a sensor cable and for determining the intruder distance from the cable to precisely locate multiple, simultaneously occurring intrusions. The method includes the steps of: generating a TX signal and transmitting same over a first transmission line of the sensor cable, for creating an electromagnetic field; detecting an RX signal induced in a second transmission line of the cable by the electromagnetic field and identifying in the RX signal a contra-directional reflection received from a target and a co-directional reflection received from the far-end of the first transmission line, processing the contra-directional reflection for providing a first coordinate of the target, and processing the co-directional reflection for providing a second coordinate of the target. The method and system may also be implemented with a "true one cable" using a single coaxial cable sensor with a directional coupler for separating coupled signals along a single transmission line in the cable. Ultra high speed data correlation of the RX signal is achieved through use of a field programmable gate array. The present invention also provides a separate calibrated threshold for every meter of cable to reduce the installation cost associated with meticulous control and the number of cables required for sites with varying burial mediums. In another embodiment, the use of two parallel single cables may be utilized whereby each cable in the system is used to detect and locate intruders independently and more clearly define the direction of crossing and the speed of crossing.

25 Claims, 7 Drawing Sheets

U.S. PATENT DOCUMENTS

| | | | |
|---|---|---|---|
| 4,415,885 A | | 11/1983 | Mongeon |
| 4,562,428 A | | 12/1985 | Harman et al. |
| 4,760,295 A | * | 7/1988 | Macalindin .................. 310/27 |
| 4,987,394 A | | 1/1991 | Harman et al. |
| 4,994,789 A | * | 2/1991 | Harman ..................... 340/552 |
| 5,068,642 A | * | 11/1991 | Hruby et al. ................ 340/562 |
| 5,446,446 A | * | 8/1995 | Harman ..................... 340/566 |
| 5,448,222 A | * | 9/1995 | Harman ..................... 340/566 |
| 5,914,655 A | * | 6/1999 | Clifton et al. ............... 340/506 |
| 6,252,507 B1 | * | 6/2001 | Gagnon ..................... 340/552 |
| 6,271,754 B1 | * | 8/2001 | Durtler ...................... 340/552 |
| 6,424,289 B2 | | 7/2002 | Fukae et al. |
| 6,577,236 B2 | | 6/2003 | Harman |
| 2002/0041232 A1 | * | 4/2002 | Harman ..................... 340/541 |

OTHER PUBLICATIONS

Coupled-Line Metamaterial Coupler having Co-Directional Phase but Contra-Directional Power Flow—Islam R.; Elek F.; Eleftheriades, G.V., IEEE Electronics Letters vol 40, Issue 5, Mar. 4, 2004 (pp. 315-317).

Advancements in Leaky Cable Technology for Intrusion Detection—Dr. RK Harmon and John E. Siedlarz, 1982 Carnahan Conference on Security Technology, May 12-14, 1982 at p. 118.

* cited by examiner

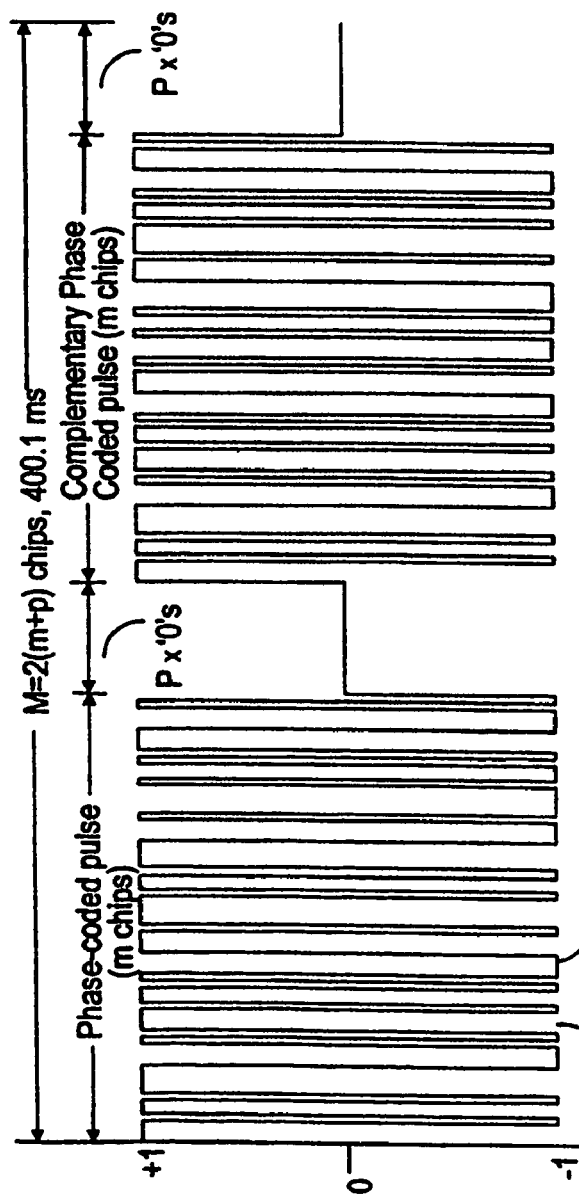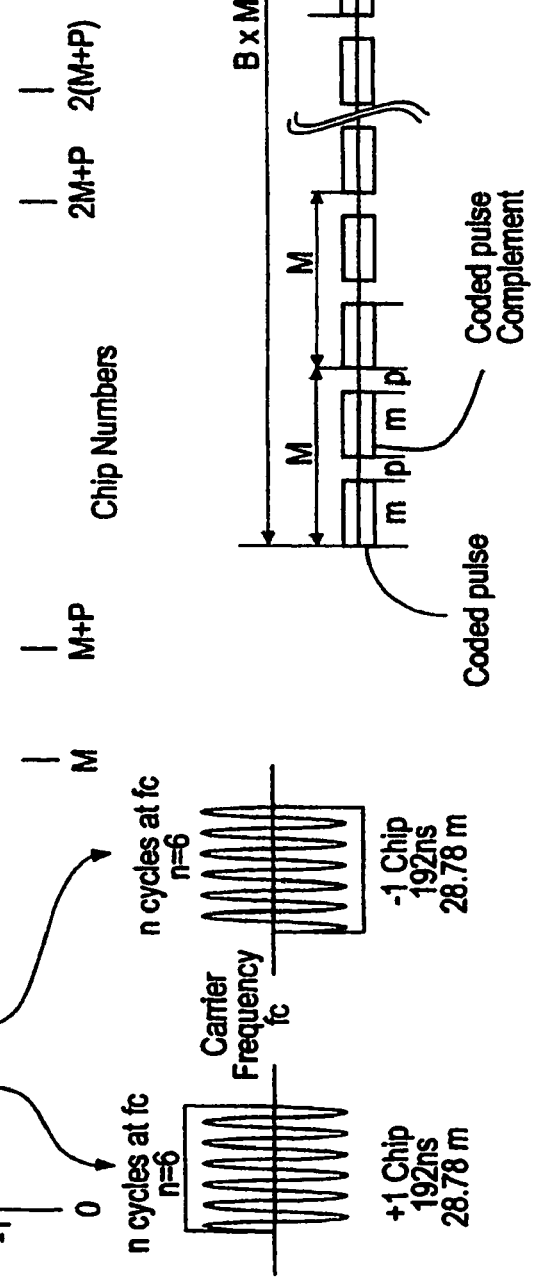

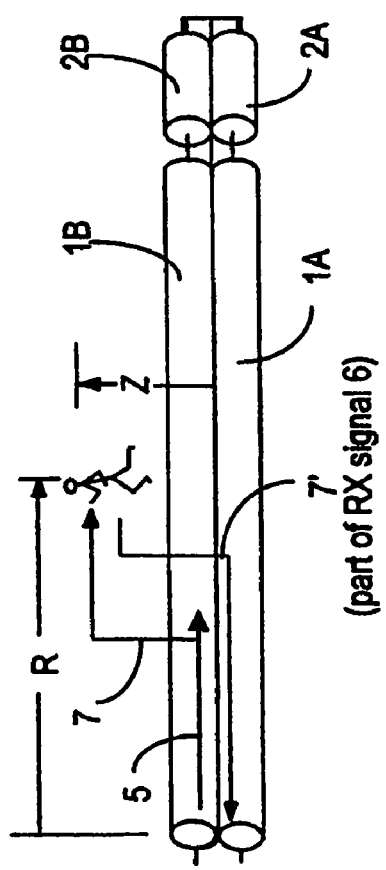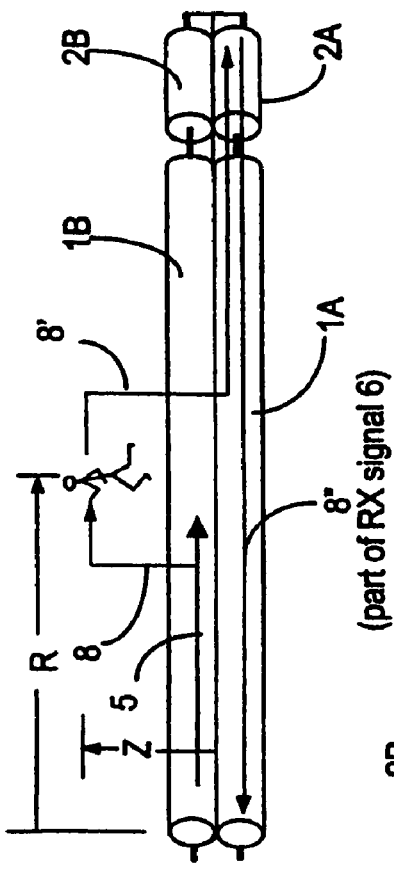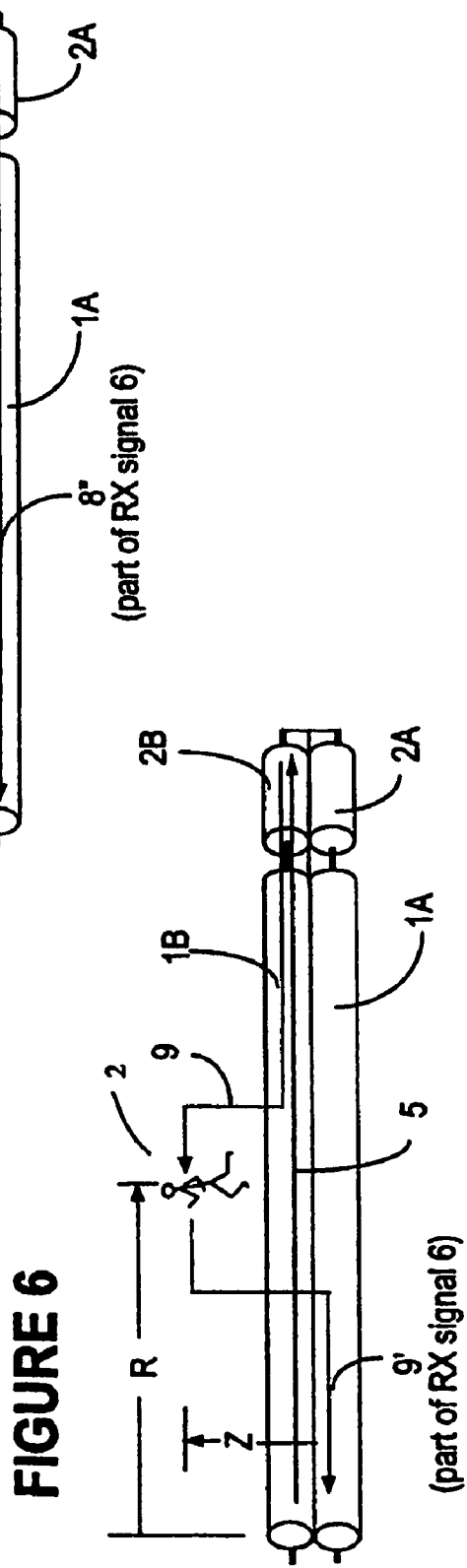

CABLE GUIDED INTRUSION DETECTION SENSOR, SYSTEM AND METHOD

BACKGROUND OF THE INVENTION

1. Field of the Invention

The invention is directed to presence detecting systems and in particular to a cable guided detecting system and method.

2. Description of the Prior Art

One of the first leaky coaxial cable sensors is described in Canadian Patent No. 1,014,245 (Harman), entitled for a "Perimeter Surveillance System Using Leaky Coaxial Cables", issued 19 Jul. 1977" (corresponding to U.S. Pat. No. 4,091,367). This patent describes a pulsed guided radar using one leaky coaxial cable to create an electromagnetic field and a parallel second coaxial cable to monitor the field to detect and locate intruders moving in proximity to the cables. A number of products based on this invention have been successfully deployed to detect and locate intruders at high security sites in North America and around the world.

A number of lower cost Continuous Wave (CW) leaky coaxial cable products were introduced based on contra-directionally coupled cables as described in U.S. Pat. No. 4,562,428 (Harman et al), issued Dec. 31, 1985 and co-directionally coupled cables as described in U.S. Pat. No. 4,415,885 (Mongeon) issued Nov. 15, 1983. While CW transmission used by these products reduced the cost of the intruder detectors, they are unable to locate intruders along the cable length. In practice these products are limited to buried cable, even if they use as the sensor cable a dual coaxial cable as described in U.S. Pat. No. 4,987,394 (Harman et al.), issued Jan. 22, 1991.

The contra-directionally coupled sensors described in U.S. Pat. No. 4,091,367 and No. 4,562,428 require the use of "graded" cables. One form of cable "grading" a leaky coaxial cable is to provide apertures in the outer conductor that increase in size with the length of cable. This can significantly increase the cost of the cable. One of the advantages of a co-directionally coupled sensor is that there is no need for cable "grading" since the signal path length remains constant for targets at any location along the length of the cable. In the sensor described in U.S. Pat. No. 6,577,236 the ability to locate the intruder is used to apply a different threshold for every meter of cable thereby avoiding the need for "graded" cable in this particular contra-directionally-coupled sensor. This is similar to the thresholding technique used in the system described in U.S. Pat. No. 4,091,367. The system described in this patent also uses the location information arising from the use of a coded pulse transmission to avoid the need for cable "grading".

To date, leaky coaxial cable sensors require the use of separate transmit and receive cables. In some cases these cables are buried in separate trenches several feet apart from each other while in other cases the two coaxial lines are encased in a single jacket, commonly referred to as Siamese cables. Such Siamese cables substantially reduce the cost of installation but such cables are complex and expensive to fabricate.

The leaky cable sensor described in U.S. Pat. No. 6,577,236 (Harman), issued 10 Jun. 2003, describes a frequency modulation (FM) continuous wave (CW) leaky coaxial cable sensor with Siamese cable. The FM of the RF transmission facilitates the use of Fast Fourier Transform (FFT) digital signal processing to detect and locate intruders along the length of the cable. This technique is limited by the existence of side lobes as an artefact of the FFT. While these side lobes can be reduced by the use of windowing techniques the side lobes can cause nuisance alarms due to the relatively high attenuation of the cable. In addition these techniques attenuate the signal and can reduce the signal to noise ratio (SNR). The ability of products based on U.S. Pat. No. 6,577,236 to locate intruders along the length of the cable overcomes some of the sources of nuisance alarms with cables laying on the surface of the terrain it remains to be proven that this is adequate to make a practical rapid deployment product.

Complementary Golay codes are described in U.S. Pat. No. 5,446,446 (Harman), issued Aug. 29, 1995, and entitled "Differential Multiple Cell Reflex Cable Intrusion Detection System and Method", which uses an acoustic cable sensor for locating intruders climbing on, or cutting through, a fence. The coded pulse is used like a Time Domain Reflectometer (TDR) to detect and locate vibrating wires inside the cable shield. Analog correlation techniques are used sequentially, to determine if a target is present in each range bin along the length of the cable. This means that for each complementary coded transmission, only one range bin is polled. Hence the update rate for each range bin is inversely proportional to the number of range bins. The present invention seeks to overcome this shortcoming by simultaneously polling all range bins to increase the update rate and thus enhance performance of the sensor.

U.S. Pat. No. 6,424,289 granted Jul. 23, 2002 describes a spread spectrum leaky coaxial cable sensor. This patent is directed at a system to locate a stationary obstacle between two leaky coaxial cables such as a rock on a railway. It is not suited to detect multiple simultaneous intruders, as is the intent of the present invention. The system described in U.S. Pat. No. 6,424,289 also claim the application of power and data over the sensor cables. The sensor described in U.S. Pat. No. 6,424,289 is not practical for the detection of multiple simultaneous targets as is required in perimeter security. The received spread spectrum response is correlated with a delayed version of the spread spectrum code to locate the obstacle. The time delay is adjusted to maximize the correlation. This works fine for very large single targets. It overlooks the fact that there will be large returns from all objects along the length of the cables and the one to be detected must be larger than any of these normal environmental returns. In the case of a human target as in an intruder detection application the response is much smaller than the normal environmental returns. In this case the movement of the human is detected using filtering as the pass band of the minute changes caused by the moving intruder is above the pass band of the normal changes in time of the environmental return.

There are two major problems associated with the use of leaky coaxial cable sensors with the cables laying on the surface of the terrain. The first is the extreme sensitivity of such sensors to minute movement of the cable relative to the surface as induced by wind or even thermal expansion of the cable. The second problem is that large objects such as trucks are often detected far beyond the desired detection zone around the cable. The present invention seeks to address these problems.

Another shortcoming is that the prior art restricts CW leaky coaxial cable sensors to one threshold per length of cable. Yet there are significant (10 to 20 dB) variations in sensitivity along a typical 100 meter length of cable due to the variations in the soil properties and installation parameters. With only one threshold these variations can cause false alarms at one location and the lack of detection of intruders at other locations. This also creates significant variations in the size of the detection zone along the length of the cable. In order to minimize these effects, the installer must adhere to a number of costly restrictions including, the use of separate cables for each burial medium (soil, concrete, asphalt etc.) and the meticulous control of cable spacing and cable burial depth. There is a need to overcome the inherent shortcomings in these products.

There is also a need to provide an intrusion detecting system that is easy to install, where the sensor cable may be buried in the terrain surface or not, and which detect intruders and locate their position with high precision and reliability.

Most current leaky coaxial cable sensors require the use of separate transmit and receive cables. In some cases these are separate cables and in other cases Siamese cables where the transmit and receive coaxial lines share a common jacket. Alternatively, either the receive or transmit cable may be replaced by an antenna to create a cable system with one antenna and one cable sensor. The present invention seeks to improve the current cable embodiments by sharing the transmit and receive function on the same leaky coaxial cable to generate significant cost savings both in hardware and in installation costs.

SUMMARY OF THE INVENTION

The present invention provides a cable-guided intrusion detecting system and method that alleviate totally or in part the drawbacks of the current systems and methods.

The present invention also provides an intrusion detecting system and method for precisely locating an intruder along the length of a sensor cable and also determining the intruder distance from the cable.

Still further, the present invention provides a manner to precisely locate multiple, simultaneously occurring intrusions.

To eliminate the effects of variations in sensitivity along the cable, the present invention provides a separate calibrated threshold for every meter of cable thereby reducing the installation cost associated with meticulous control and the number of cables required for sites with varying burial mediums.

According to one aspect of the invention, there is provided a method for detection and location of an intruder crossing into an area defined by a sensor cable, comprising: generating a TX signal and transmitting same over a first transmission line of the sensor cable, for creating an electromagnetic field; detecting an RX signal induced in a second transmission line of the cable by the electromagnetic field and identifying in the RX signal a contra-directional reflection received from a target and a co-directional reflection received from the far-end (F) of the first transmission line; and processing the contra-directional reflection for providing a first coordinate (R) of the target, and processing the co-directional reflection for providing a second coordinate (Z) of the target.

In another aspect of the present invention, an intrusion detection sensor is provided comprising: means for generating a TX signal and transmitting same over a first open transmission line, for creating an electromagnetic field; means for converting an RX signal induced in a second open transmission line by the electromagnetic field into an in-phase (I) component and a quadrature-phase (Q) component for each of a plurality B of range bins corresponding to a respective linear distance R; means for processing the I and the Q components for each the range bin for detecting an intruder and specifying coordinates R and Z of the intruder, wherein R is a linear distance along the first transmission line and Z is a radial distance from the first transmission line.

In another aspect of the present invention, an intrusion detection system is provided comprising: a sensor cable with a first and a second open transmission line, for deployment along a boundary of an area of interest; means for generating a TX signal and transmitting same over the first transmission line of the sensor cable, for creating an electromagnetic field; means for detecting an RX signal induced in the second transmission line by the electromagnetic field and identifying in the RX signal a contra-directional reflection received from a target and a co-directional reflection received from the far-end (F) of the first transmission line; and means for processing the contra-directional reflection for providing a first coordinate (R) of the target, and processing the co-directional reflection for providing a second coordinate (Z) of the target.

In another aspect of the present invention, a method for detection and location of an intruder crossing a boundary is provided comprising: deploying a sensor cable with a first and a second open transmission line along the( periphery of an area of interest; generating a TX signal and transmitting same over the first transmission line, for creating an electromagnetic field; converting an RX signal induced in a second transmission line by the electromagnetic field into an in-phase (I) component and a quadrature-phase (Q) component for each of a plurality B of range bins corresponding to a respective linear distance along the sensor cable; processing the I and the Q components for each the range bin for detecting an intruder and specifying the coordinates R and Z of the intruder, wherein R is a linear distance measured along the cable, and Z is a radial distance from the cable.

In another aspect of the present invention a sensor cable is provided comprising: a first and a second transmission line, each comprising a centre conductor and a dielectric core surrounding the centre conductor; a common outer conductor that partially surrounds the first and the second cores for creating two transmission lines with longitudinal slots through which an electromagnetic field created in one of the transmission lines couples into the other transmission line; and a jacket for encasing the dielectric cores.

In another aspect of the present invention, a method for detection and location of a target crossing into an area defined by a sensor cable is provided, comprising: generating a TX signal and transmitting same over a transmission line of the sensor cable, for creating an electromagnetic field; receiving a coupled signal in the transmission line and separating an RX signal from the coupled signal in the transmission line caused by the target disturbing the electromagnetic field; detecting the RX signal and identifying in the RX signal a contra-directional reflection received from the location of the target; and processing the contra-directional reflection for providing a range of the target.

In another aspect of the present invention, an intrusion detection sensor is provided, comprising: means for generating a TX signal and transmitting same over a transmission line, for creating an electromagnetic field; a directional coupler for detecting a coupled signal in the transmission line and for separating an RX signal from the coupled signal in the transmission line, caused by a target disturbing the electromagnetic field; means for converting the RX signal into an in-phase (I) component and a quadrature-phase (Q) component for each of a plurality B of range bins corresponding to a respective linear distance (R); and means for processing the I and the Q components for each range bin for detecting the target and specifying coordinates R and Z of the target, wherein R is a linear distance along the transmission line and Z is a radial distance from the transmission line.

In another aspect of the present invention, an intrusion detection system is provided, comprising: a sensor cable with a transmission line, for deployment along a boundary of interest; means for generating a TX signal and transmitting same over a transmission line of the sensor cable, for creating an electromagnetic field; a directional coupler for detecting a coupled signal in the transmission line and for separating an RX signal from the coupled signal in the transmission line caused by the target disturbing the electromagnetic field; means for detecting the RX signal and identifying in the RX signal a contra-directional reflection received from the location of the target; and means for processing the contra-directional reflection for providing a range of the target.

In another aspect of the present invention, a method for detection and location of a target crossing a boundary is provided, comprising: deploying a sensor cable having a transmission line along the periphery of an area of interest; generating a TX signal and transmitting same over the transmission line, for creating an electromagnetic field; receiving a coupled signal and separating an RX signal from the coupled signal in the transmission line caused by the target disturbing the electromagnetic field; converting the RX signal into an in-phase (I) component and a quadrature-phase (Q) component for each of a plurality B of range bins corresponding to a respective linear distance R; processing the I and the Q components for each range bin for detecting the target and specifying the coordinates R and Z of the intruder, wherein R is a linear distance measured along the cable, and Z is a radial distance from the cable.

In another aspect of the present invention, a method for detection and location of a target crossing into an area defined by a sensor cable is provided, comprising: generating a first TX signal and transmitting the first TX signal over a first transmission line of the sensor cable and simultaneously generating a second TX signal and transmitting the second TX signal over a second transmission line of the sensor cable, for creating an electromagnetic field; receiving a first coupled signal corresponding to the first TX signal in the first transmission line and separating a first RX signal from the first coupled signal in the first transmission line caused by the target disturbing the electromagnetic field, and simultaneously receiving a second coupled signal corresponding to the second TX signal in the second transmission line and separating a second RX signal from the second coupled signal in the second transmission line caused by the target disturbing the electromagnetic field; detecting the first RX signal and identifying in the first RX signal a first contra-directional reflection received from the location of the target, and simultaneously detecting the second RX signal and identifying in the second RX signal a second contra-directional reflection received from the location of the target; correlating the first and the second contra-directional reflection; and processing the correlated first and second contra-directional reflection to provide a range of the target.

In another aspect of the present invention an intrusion detection sensor is provided, comprising: means for generating a first TX signal and transmitting same over a first transmission line of a sensor cable, for creating an electromagnetic field; means for simultaneously generating a second TX signal and transmitting same over a second transmission line of the sensor cable, for creating an electromagnetic field; a first directional coupler for detecting a first coupled signal in the first transmission line corresponding to the first TX signal, and separating a first RX signal from the first coupled signal in the first transmission line, caused by a target disturbing the electromagnetic field; a first means for converting the first RX signal into a first in-phase (I) component and a first quadrature-phase (Q) component for each of a plurality of range bins corresponding to a respective linear distance R; a second directional coupler for simultaneously detecting a second coupled signal in the second transmission line corresponding to the second TX signal, and separating a second RX signal from the second coupled signal in the second transmission line, caused by a target disturbing the electromagnetic field; a second means for converting the second RX signal into a second in-phase (I) component and a second quadrature-phase (Q) component for each of the plurality of range bins corresponding to the respective linear distance R; means for processing the first and the second I and the Q components for each range bin for detecting the target and specifying coordinates R and Z of the target, wherein R is a linear distance along the transmission line and ZR is the ratio of distances to the first and the second transmission lines.

In another aspect of the present invention an intrusion detection system is provided, comprising: a sensor cable with a first and a second transmission line, for deployment along a boundary of an area of interest; means for generating a first TX signal and transmitting the first TX signal over the first transmission line of the sensor cable and means for simultaneously generating a second TX signal and transmitting the second TX signal over the second transmission line of the sensor cable, for creating an electromagnetic field; a first directional coupler for receiving a first coupled signal corresponding to the first TX signal in the first transmission line and separating a first RX signal from the first coupled signal in the first transmission line caused by the target disturbing the electromagnetic field; means for detecting the first RX signal and identifying in the first RX signal a first contra-directional reflection received from the location of the target; a second directional coupler for simultaneously receiving a second coupled signal corresponding to the second TX signal in the second transmission line and separating a second RX signal from the second coupled signal in the second transmission line caused by the target disturbing the electromagnetic field; means for detecting the second RX signal and identifying in the second RX signal a second contra-directional reflection received from the location of the target; means for correlating the first and the second contra-directional reflection; and means for processing the correlated first and second contra-directional reflection to provide a range of the target.

In another aspect of the present invention a method for detection and location of a target crossing a boundary is provided, comprising: deploying a sensor cable, having a first and a second transmission line, along the periphery of an area of interest; generating a first signal TX and transmitting the first TX signal over the first transmission line of the cable; simultaneously generating a second TX signal and transmitting the second TX signal over the second transmission line of the sensor cable, for creating an electromagnetic field; detecting a first coupled signal in the first transmission line, and separating a first RX signal from the first coupled signal in the first transmission line caused by the target disturbing the electromagnetic field; converting the first RX signal into an first in-phase (I) component and a first quadrature-phase (Q) component for each of a plurality B of range bins corresponding to a respective linear distance along the sensor cable; simultaneously detecting a second coupled signal in the second transmission line, and separating a second RX signal from the second coupled signal in the second transmission line caused by the target disturbing the electromagnetic field; converting the second RX signal into an second in-phase (I) component and a second quadrature-phase (Q) component for each of the plurality B of range bins corresponding to the respective linear distance along the sensor cable; and processing the first and the second I and the Q components for each the range bin for detecting the target and specifying the coordinates R and Z of the intruder, wherein R is a linear distance measured along the cable, and ZR is the ratio of the distances to the first and the second transmission lines. is a.

In the present invention, the composite coded response is digitized and passed to an ultra high speed digital correlator where the I and Q responses for multiple range bins are generated simultaneous with the digitization of the response. In this process every coded transmission is used to update every range bin of data thereby greatly increasing the duty cycle and hence the signal to noise ratio. In addition, the spectrum of the complementary codes are spread using pseudo random sequences to reduce the effects of interfering signals and orthogonal codes are generated to separate the responses from multiple cables operating in proximity to each other.

Zero mean pseudo random complementary and orthogonal codes are used to provide effective thumbtack correlation responses and immunity to interfering signals. The zero mean nature of the codes allows one to utilize DC power over the cables without jeopardizing the performance of the coded response. The complementary nature creates the general thumbtack response for targets along the length of sensor cable. The pseudo random nature of the code enhances the cancellation of the complementary codes as well as minimizing the effects of interfering signals by spreading the spectrum of such signals. The orthogonal nature of the code allows for the use of common analog circuitry for two or more cables while preserving the integrity of each cable response.

The ultra high speed correlation of the digitized composite coded response signals provides the simultaneous correlation of the response into multiple range bins. This facilitates the use of long codes that provide duty cycles that approximate simultaneous CW sensor performance in each of the multiple range bins. An unprecedented dynamic range is achieved through the simultaneous summation of large numbers of samples in each of the multiple range bins. The synchronous nature of the carrier and code generation in a single FPGA provides a very stable and noise free process.

The stability and dynamic range of the ultra high speed correlation processing system facilitates a "true one cable" sensor as it enhances the benefit of using a single leaky coaxial cable for both transmit and receive purposes. The received signal is separated from the transmit signal by means of a directional coupler. This "true one cable" sensor results in substantial cost savings.

This novel approach to leaky coaxial cable sensor signal processing offers numerous advantages over the prior art. The simultaneous collection and correlation of co-directional coupling and contra-directional coupling reduces the effects of cable motion due to environmental factors such as thermal expansion. In addition, the correlation of the response from a "true one cable" sensor also reduces the effects of cable motion.

Two "one cable" sensors can be combined into a stereo cable guided radar. In this case the intruder is detected and located simultaneously on parallel one cable sensors. Correlating the responses from the two one cable sensors gives rise to target tracking and target classification. These features can be used to enhance Closed Circuit Television (CCTV) assessment of alarms and to more effectively deploy response forces.

BRIEF DESCRIPTION OF THE DRAWINGS

FIG. 2 shows an example of the RX signal generated by the sensor illustrated in FIG. 1, and FIG. 3 shows M coded pulse sequences for B range bins.

FIGS. 4-6 illustrate how a TX signal is perturbed by an intruder; where FIG. 4 shows a contra-directional coupling, FIG. 5 shows a forward co-directional coupling, FIG. 6 illustrates a reverse co-directional coupling.

FIG. 9 shows detection of the target range bin and FIG. 10 shows the detection of the target sub-bin.

DETAILED DESCRIPTION OF THE INVENTION

Figure 1:
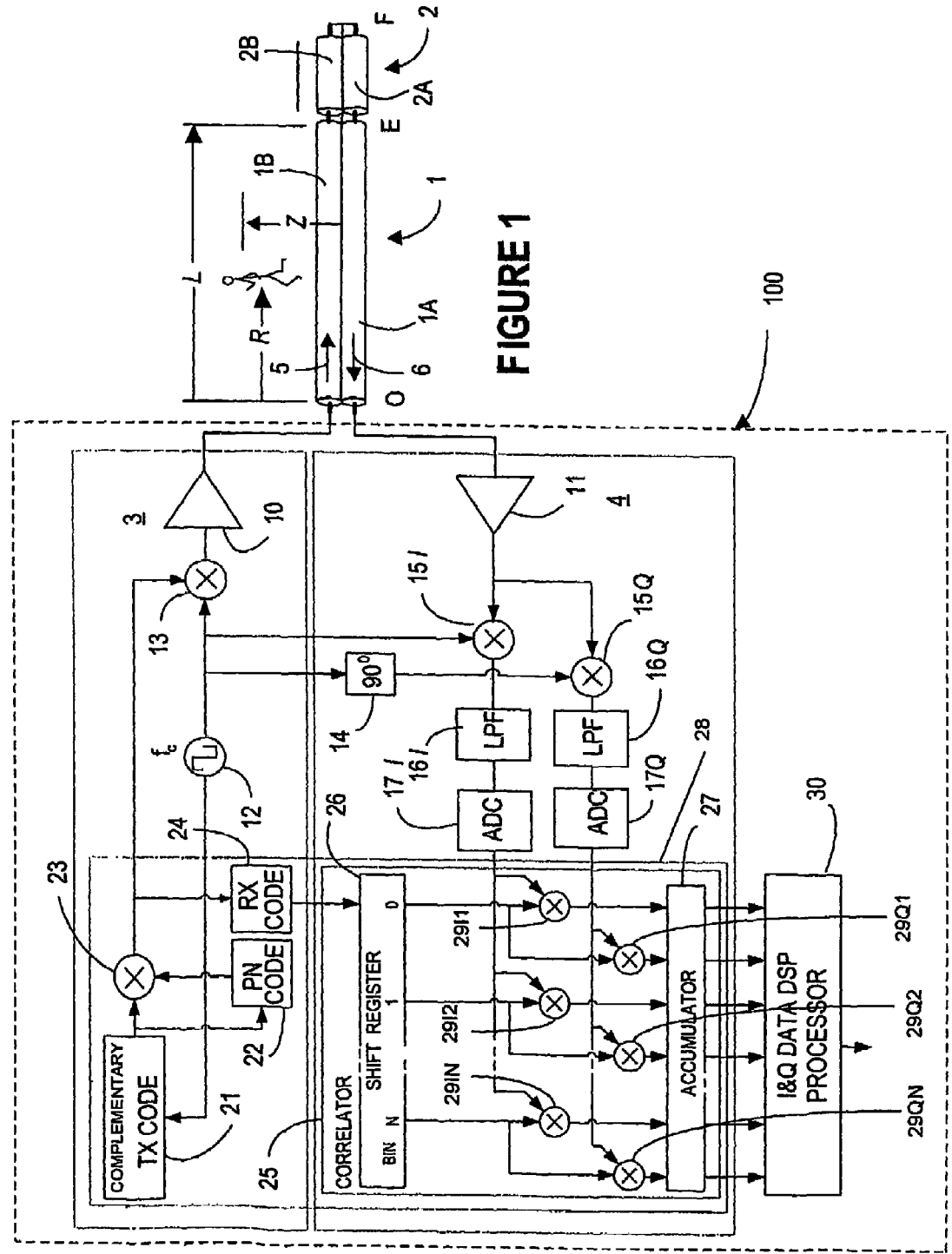
FIG. 1 is a block diagram of an intrusion detecting system according to a first embodiment of the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

It is understood that an aim of the presence detecting system is to detect intruders. It is also understood that the present invention detects animals, metal objects, and any other detectable presence. The set of intruders, animals and metal objects is classified as a target. The following method and system in its various embodiments applies to both intruders and more generally to targets.

The present invention creates an invisible electromagnetic field surrounding a leaky coaxial cable transmission line by transmitting a phase modulated coded pulse down the cable. The external energy reflects off a target moving in proximity to the cable and some of the reflected energy couples into a receive coaxial cable where it propagates back to the processor. Traditionally, the transmit and receive cables are separate cables that are buried parallel to each other around the perimeter to be protected. More recently, the transmit and receive coaxial cables are manufactured in the same jacket so as to simplify installation by requiring only one as opposed to two trenches. In one embodiment of the present invention, the transmit and receive cable can be the same coaxial cable with a directional coupler used to separate the transmit and receive signals.

The received signal is synchronously detected into its in-phase (I) and Quadrature-phase (Q) components. These baseband components are digitized and passed to the ultra high-speed correlator. The output of the ultra high-speed correlator is the I and Q responses for a multiplicity of range bins along the length of cable. The correlated I and Q outputs are summed in two accumulators for each of the multiplicity of range bins. The duty cycle associated with this process is typically between 95% and 100%. Because of the 12 to 14-bit resolution of the analog to digital convert used to digitize the I and Q data and the large number of samples that are summed for each bin the process provides the very large dynamic range that is required to accommodate the large clutter to target ratio. This ratio is even more dramatic when a common cable is used to transmit and receive signals.

The magnitude of the response derived from the square root of the sum of the squares of the I and Q components is used to find local peaks in the array of range bin data. The phase angle of the response derived from the arctangent of the ratio of Q to I along with the relative magnitude of the neighbouring range bins is used to precisely locate each potential target. Once located the response is compared to a calibrated threshold for each meter of cable. In this way multiple simultaneous targets can be located and detected along the length of cable.

Non-leaky coaxial cables are connected to the end of the leaky coaxial transmission lines to provide a structure for the external field to propagate beyond the end of the sensor and attenuate. The ends of the non-leaky coaxial lead-out cable are terminated in an impedance other than the characteristic impedance of the cable, so as to reflect the coded pulse back towards the processor. The reflection associated with the transmitted coded pulse sequence is referred to as the contra-directionally coupled response while that associated with the reflection returned from the end of the lead-out cables is referred to as the co-directionally coupled response.

The range bins associated with the contra-directionally coupled response provide range information in terms of the distance along the sensor to the target. The thumbtack correlation response ensures that a target "appears" in three consecutive range bins. Linear interpolation of the range bin data and target phase information are used to precisely locate each target. There can be multiple simultaneous targets; the chip length determines the resolution between multiple simultaneous targets.

The range information derived from the contra-directional coupled response is used to create a separate threshold for every meter of cable. This facilitates the use of uniformly graded cable, thereby reducing cable cost and ensuring optimal sensor performance in applications where the sensitivity varies along the length of the sensor due to site conditions such as varying soil conditions (clay versus sand etc.).

The range bins associated with the co-directional coupled response respond to a target at any location along the length of the sensor. This information is used to desensitize the sensor to changes that occur in close proximity to the sensor cable, while detecting intruders 1-2 meters from the sensor cable. It is this process that makes the sensor function with the cable lying on the surface of the terrain. The co-directional coupled response data is also used to prevent detection of large objects beyond the desired detection zone around the cable.

The correlation of the contra-directionally coupled response and co-directionally coupled response reduces the number of false alarms while providing a well-defined uniform detection zone along the length of the sensor relative to the prior art.

FIG. 1 shows a block diagram of the intrusion detecting system according to a first embodiment of the present invention, and FIGS. 2 and 3 show an example of how a phase-coded pulse sequence is generated, and how the reflected signal is processed, respectively. FIG. 1 is described with references to FIGS. 2 and 3.

The intrusion detection system comprises a sensor cable 1, an intrusion detecting unit 100 connected at one end of the sensor cable 1, and a termination lead-out 2 connected at the other end of the sensor cable 1. The detecting unit 100 includes a transmit unit 3, a receive unit 4 and a data processing unit 30. Transmit unit 3 generates a high frequency/very high frequency (HF)/(VHF) signal 5, hereinafter called a 'TX signal' that is transmitted along sensor cable 1. Receive unit 4 decodes a response signal 6 received from sensor cable 1, hereinafter called the 'RX signal'. In this specification, the term "forward" is used for the direction from end O to end E, and the term "reverse" is used for the opposite direction, from end E to end O. It is to be noted that forward, reverse, and far-end are relative terms and they should be construed accordingly.

In this age of terrorism and homeland security there are numerous requirements for a volumetric line sensor that can either be rapidly deployed on the surface of the terrain around a critical asset or buried in the surface to form a covert intrusion sensor. Sensor cable 1 can be laid on the surface of the terrain following the perimeter around corners and up and down hills to form a rapid deployment sensor. Alternately, sensor cable 1 can be buried in the surface of the terrain to form a covert sensor. As illustrated in the embodiment of the invention of FIG. 1, the length of cable 1 is denoted with L, and the ends of the cable are denoted with O and E, respectively. The position of an intruder in the vicinity of the cable is identified by a linear distance R to end O and a radial distance Z from the cable.

Sensor cable 1 comprises for example a pair of leaky coaxial transmission lines 1A and 1B, which are encased in a common jacket, as seen later in the example shown in FIG. 7 and described in the accompanying text. We only note here that the dielectric material used in the construction of the transmission lines largely determines the propagation velocity; the preferred dielectric material for transmission lines 1A and 1B is cellular polyethylene.

Termination lead-out 2 provided at end E of sensor cable 1 comprises two non-leaky coaxial cables 2A and 2B, as shown in FIG. 1. We denote the end of the termination lead-out 2 with F and refer to this end as far-end. Termination lead-out 2 provides a structure to allow the external surface wave to propagate beyond end F of the leaky cable 1 to attenuate in the surrounding medium. This prevents unwanted reflections from the ends of the leaky cables 1A and 1B. Part of TX signal 5 is returned from end F towards end 0; termination lead-out 2 acts as a time-delayed reflector of signal 5. Preferably, the non-leaky coaxial cables 2A and 2B have the same impedance as transmission lines 1A and 1B.

As shown in FIG. 1 and next in FIGS. 3-5, a short circuit is applied at the end F between terminating lead-out transmission lines 2A and 2B. In practice, one may equally well use an open circuit or any other well defined mismatch to the impedance of cable 1. It is beneficial to use an impedance mismatch designed to provide a reflected signal that is significant but does not overwhelm receive amplifier 11.

According to this example, the transmission line 1B is used to transmit the TX signal 5 from end O to end E of sensor cable 1. TX signal 5 creates an electromagnetic field around sensor cable 1; some of the electromagnetic field couples into transmission line 1A where it sets up a response signal, which propagates in both forward and reverse directions. The response signal 6 that propagates back to the O end of the cable is the RX signal.

The field created around line 1B decays almost exponentially with radial distance Z from the cable. The coupling between transmission line 1A and 1B is largely affected by the medium immediately surrounding the sensor cable, due to this rapid decay rate of the electromagnetic fields. When an intruder moves in the electromagnetic field surrounding the cable, the coupling between lines 1A and 1B is modified slightly due to the intruder's body. This can be viewed either as scattering of RF energy due to the conductive nature of the human body, or as a phase change due to the relative dielectric constant of the human body. In either case, it is this minute change in coupling that is to be detected and located in the operation of the intrusion detecting system of the invention.

Furthermore, the component of the RX signal reflected from a target decays exponentially with range R of the target from end O, due to the attenuation in transmission lines 1A and 1B. This attenuation is largely due to the copper losses in the two transmission lines and the losses in the coupled external fields. In the past, this attenuation has been compensated for by changing the design of the leaky transmission lines with range R, to increase coupling in a process that is often referred to as cable grading. In the present invention, selection of the parameters of TX signal 5 enables processor 30 to use range bins and range sub-bins and determine range R with a high precision. For example, the embodiment of FIG. 1 when using a TX signal as in FIG. 2 enables detecting targets located within each 1 m length of cable. This permits use of non-graded cables, which provides a significant cable cost savings.

The TX signal 5 utilized in accordance with the present invention is a phase-coded pulse sequence, whic has a $$\frac{\sin(x)}{x}$$

spectrum, where the main lobe width is defined by the chip width in the phase code. The phase coding is selected to provide a thumbtack correlation response that is used to determine the location R of the target along the length of the cable and to simultaneously derive the co-directionally coupled response that measures the radial range Z from the cable. TX signal 5 is amplified at the input to the line 1B, as shown by a transmit amplifier 10. This amplifier 10 incorporates filtering means remove frequency components outside of the main lobe of the spectrum so as to comply with radio regulations.

The RX signal 6 is very complex, as it is the composite of all reverse coupling all along sensor cable 1 and from the termination cable 2. With no intruder present, this complex signal is referred to as the clutter. This clutter can change in time as the environment around the cable changes. Fortunately, the changes due to an intruder moving in the field of the cable tend to occur at a higher frequency than the environmental changes. While this is generally true for cables buried in the terrain, it is not always true of cables laying on the surface of the terrain. Due to the rapid radial decay of the external electromagnetic fields surrounding the sensor cable 1, minute motion of the cable relative to the surface of the terrain tends to be in the intruder pass band. This has in the past limited the application of leaky coaxial cable sensors to buried applications.

A receive amplifier 11 amplifies the RX signal 6 that propagates in the reverse direction along transmission line 1A. Filter means are included in amplifier 11 to reject RF energy outside the pass band of the main lobe of the $$\frac{\sin(x)}{x}$$

spectrum.

It is the time delay in the propagation of the phase-coded pulse sequence from transmit amplifier 10 to the receipt of the reflection from intruder and back to receive amplifier 11 that is used to determine the range R along the length of the cable and the radial distance Z from the cable of the target.

The transmit unit 3 comprises a crystal oscillator 12 that generates a carrier signal with the frequency $f_c$ in the HF/VHF transmission band. In the preferred embodiment of the invention the carrier frequency is 31.25 MHz. It is to be noted that the values used in the following for various parameters of TX signal and the size of the sensor cable are related to this carrier frequency. Nonetheless, the present invention is applicable to other values for these parameters and of the carrier frequency, determined in a similar way as shown next for the $f_c$ of 31.25 MHz.

The finite range of the sensor cable 1 with the cable termination lead-out 2 and the relatively slow movement of intruders make complementary codes ideal for this application. The time correlation of complementary codes is commonly referred to in the art as a "thumbtack" as it has no time correlation sidelobes. A thumbtack correlation function derived through the use of complementary codes is particularly useful in leaky coaxial cable sensors to cope with the relatively large attenuation of the response in the cables. This type of TX signal is superior to an FM CW chirp where the Fast Fourier Transform provides side lobes, or to a straight PN (Pseudo-Noise) code, which has side lobes in the order of 1/NL where NL is the length of the code.

Complementary codes have time correlation sidelobes, which are equal and opposite. Hence, when correlated responses to complementary codes are added together, perfect thumbtack responses are obtained. Perhaps the best-known complementary codes are the 2-bit and 4-bit Barker codes [{+1,−1}, {+1,+1}] and [{+1,−1,+1,+1}, {+1,−1,−1,−1}].

In 1961 M. J. E. Golay published a paper entitled "Complementary Series" describing how one can generate much longer complementary codes than the four-bit complementary Barker code. It is easy to generate Golay complementary codes of length $2^m$, where m is a positive integer (there are a few other Golay complementary codes but these cannot easily be generated by simple "seed" codes.)

Section 9 of the paper by Golay describes a simple means of generating codes with a length $2^m$ from "seed codes". For example starting with the two chip Barker codes α1={+1,+1} and β1={+1,−1} one can easily generate the four chip Barker codes β2={+1,+1,+1,−1} and β2={+1,+1,−1,+1} by noting that α2={α1,β1} and β2={α1,$\overline{β1}$} where the bar denotes sign inversion. Simply continuing this concatenation process α3={α2,β2}, β3={α2,$\overline{β2}$}, α4={α3,β3}, β4={α3,$\overline{β3}$}, α5={α4,β4}, β5={α4,$\overline{β4}$}, α6={α5,β5} and β6={α5,$\overline{β5}$}. It is complementary code α6 and β6 that are illustrated in FIG. 2. In practice, even longer codes such as α10,β10 are used but these are not as easily illustrated.

Other codes of the same length can be easily generated by performing the functions described in the Golay paper as a) interchanging the series, b) Reversing the first series, c) Reversing the second series, d) Altering the first series, e) Altering the second series and f) Altering the elements of even order of each series. Some of these operations may create the same result but it is sufficient to say that one can create a number of different complementary codes by performing these operations on the "seed" codes α1 and β1. Different codes can be created by adjacent processors to enhance the isolation between adjacent processors.

The coded pulse sequence used in accordance with the present invention is a complementary Golay code pair generated in TX code generator 21, imbedded in a Pseudo-Noise (PN) code generated by the PN code generator 22. In order to generate a thumbtack correlation response, one transmits a Golay code such as α10 followed by a number of zeros, then the complementary code such as β10 and a number of zeros. The space in which nothing is transmitted must be sufficiently long to ensure that the code and the complementary code are never propagating in sensor cable 1 at the same time. The pulse compression ratio that results from this process is $2^{n+1}$, which is twice the phase-coded pulse length. The TX code generator 21 uses n=6 to produce a coded pulse length m=1024 chips, which provides a pulse compression ratio of 2048 for the TX signal.

In order to have the coded pulse clear the sensor cable 1 before the complement is transmitted, a number p of logic 0's need to be added between the code and its complement and between the complement and the next transmission of the code. In the present invention, the number of logic 0's is 20, p=20. The TX coded pulse sequence generated by TX code generator 21 is 2088 chips (2m+2p=2048+40=400.1) or 400.1 microseconds long. This means that there is a duty cycle of 98.1% (2048/2088=0.981).

The coded pulse is generated synchronous to the carrier frequency as illustrated in FIGS. 1, 2 and 3. There are exactly n (n=6 in this example) cycles of the carrier frequency in each chip of the coded pulse. There are three states to the coded pulse; +1 state corresponds to 6 cycles of a sine wave starting with a positive going half cycle, 0 state is 6 cycles of zero amplitude, and −1 state corresponds to 6 cycles of a sine wave starting with a negative going half cycle. With a carrier frequency fc=31.25 MHz and n=6 cycles per chip, each chip is 192 nanoseconds long, which corresponds to a chip rate of 5.208 MHz. Assuming a 81% velocity of propagation in the sensor cable 1, a chip corresponds in this example to 23.32 meters of range along the length of the cable.

If the Golay code modulated carrier were transmitted directly it would have a $$\frac{\sin(x)}{x}$$

spectrum with lines every 2.5 kHz. In order to fill-in the spectrum more completely, the complementary code is then imbedded in a PN (pseudo-noise) code of a sufficient length. The PN code is incremented synchronously with the completion of each TX coded pulse.

The PN code is created using a maximal sequence generated by a 13-stage shift register with the appropriate feedback tapes. The PN code is for the example of FIG. 2, 8191 bits long; i.e. it has a total code length of 3.277 milliseconds. The output of the PN code generator 22 is mixed in mixer 23 with the output of the complementary TX code generator 21 to produce the complete coded pulse sequence 5. Mixer 23 is a mathematical operator that inverts the complementary code pair in the coded pulse sequence when the PN code changes state. The $$\frac{\sin(x)}{x}$$

spectrum of complete coded pulse sequence input to mixer 13 has lines every 305 millihertz, thus spreading the coded pulse sufficiently to minimize the effects of radio interference.

The complete coded pulse sequence at the output of mixer 23 is further mixed with the carrier frequency from the crystal oscillator 12 in a double balanced mixer 13 to create the transmitted phase coded pulse (TX signal 5) that is input to amplifier 10.

The above described arrangement results in a pulse compression code that provides a thumbtack correlation function, along with all the benefits of spread spectrum transmissions, including that it is difficult to detect and spoof. For a security sensor system, this is an important consideration.

The RX signal 6 carries information about presence/absence and location of an intruder in the vicinity of the cable. Receive unit 4 converts the RX signal into an in-phase component I and a quadrature-phase component Q for each of a plurality of range bins defined along sensor cable 1. To this end, the carrier frequency and a quadrature version of the carrier frequency generated in a quadrature hybrid 14 are used for the synchronous detection of the RX signal 6 received from receiver amplifier 11 in double balanced mixers 15I and 15Q. The in-phase (I) and quadrature-phase (Q) outputs of mixers 15I and 15Q are passed through low pass filters 16I and 16Q to remove the mixing cross products, while passing the respective I and Q signals of the response signal.

The output of low-pass filters 16I and 16Q are digitized in respective analog to digital Converters (ADC) 17I and 17Q. ADC units 17I and 17Q are preferably 12-bit analog to digital converters that operate at 10.417 MHz to sample the detected signal at exactly twice the chip rate (5.208 MHz). Each I and Q sample corresponds to a 'range bin' along the sensor cable. With a 96-nanosecond sample period (the chip length is 192 nsec), each range bin corresponds to 11.66 meters length of cable, assuming a relative velocity of propagation in cable 1 of 81% that of the velocity of light in free space. This means that 40 range bins would monitor up to 466.4 meters of cable. Since there is a range bin associated with each sample of the coded-pulse, there are two range bins per chip length.

The external electromagnetic fields generated by the transmitted signal builds over approximately the first 20 to 25 meters of the leaky coaxial cable when the electromagnetic field reaches its full value. Hence, a 25-meter "lead-in" or "start-up" length of sensor cable is used to connect a 400-meter length of "detection" cable. The 425 meters of sensor cable 1 corresponds to 36.45 range bins. The remaining range bins are used to monitor the termination lead-out cable 2. More precisely, the impedance mismatch of the terminating lead-out cable 2 is designed to provide sufficient time delay to clearly separate the response signal without any intruder and any reflection due to an Intruder. This means that it must be at least one chip long, which corresponds to 18.8 meters of cable for a high-density polyethylene cable.

The complementary transmit code generator 21 resides in a field programmable gate array (FPGA) 28. According to the preferred embodiment, the FPGA creates an 2088 chip long complementary code. This code is synchronized with a master clock signal generated by the crystal oscillator 12. The pseudo random noise (PN) code generator 22 also resides in the FPGA 28. The PN code is incremented at the completion of each of the 2088 long complementary code. The PN code is mixed with the TX complementary code in a mixer 23 to produce the complete code sequence, which is sent to mixer 13 where it is used to modulate the carrier frequency output of the crystal oscillator 12. The output of mixer 13 is then amplified in amplifier 10 and sent down the leaky sensor cable to set up the detection field.

The mixer functions shown inside the FPGA 28 such as mixer 23 and those in correlator 25, of the receive unit 4, are not physical mixer circuits but rather a mathematical operation. Mixer 23 operates on the logic levels associated with the TX and PN Codes. When the PN code is at logic level "+1" the TX Code is passed through unaltered, when it is "−1" the TX Code is inverted and when it is "0" the output is zero. A similar process occurs in the mixers in correlator 25 but the operation is performed on digital words coming from the analog to digital converters.

The correlator 25 includes a shift register 26, an accumulator 27, and a series of mixers 29I1, 29Q1, 29I2, 29Q2, . . . , 29IN, 29QN. The mixer elements 29I1, 29Q1, 29I2, 29Q2, . . . , 29IN, 29QN are further categorized by the output processed, I or Q, and for each range bin. When the logic level output of the Shift Register is "+1" the digital word is passed directly to accumulator 27, when it is "−1" the sign of the digital word is inverted before the word is passed to the accumulator 27 and when it is "0" nothing is added to the accumulator 27.

Mixer 23 outputs the code that when mixed in analog mixer 13 generates the RF transmission. The same output of mixer 23 is fed to the RX code generator 24, shown in the transmit unit 3 and resident in the FPGA 28. The RX code generator 24 generates a duplex encoded version of the TX coded pulse sequence. The duplex encoding is understood to mean that each +1 is replaced by {+1,+1}, each 0 is replaced by {0,0} and each −1 is replaced by {−1,−1} so as to match the sampled data which is sampled at twice the chip rate. This duplex encoded signal can be viewed as the local oscillator (LO) signal to the correlator 25.

The analog I and Q receiver responses are sampled in the ADC units 17 I and 17 Q at twice the chip rate. This is the same rate as the duplex encoded LO signal. In the preferred embodiment of the present invention, the ADC units 17 I and 17 Q take a sample every 96 nanoseconds which corresponds to a 10.4 mega sample per second rate. These data are passed to correlator 25 where the response is separated into a multiplicity of range bin responses that represent range along the length of cable.

The output of the RX Code Generator 24 is passed to the Shift Register 26 where each element is progressively delayed to form the LO for each range bin. In the preferred embodiment of the invention there are N=40 range bins to monitor the 400 meters of cable and lead-in cable.

The mixer elements 29I1, 29Q1, 29I2, 29Q2, . . . ,29IN, 29QN simply determine if the latest sample should be added, subtracted or skipped over for the particular range bin accumulator. It is the ultra high speed capability of this correlation process that leads to the exceptional performance of the present invention. Accumulator 27 dumps the accumulated I and Q samples to the I&Q Data DSP Processor 30 ten times per second, excluding the samples that are skipped over due to the zeros in the code. In the preferred embodiment of the invention accumulator 27 adds up 510,856 14-bit numbers for each of the 40 I and Q outputs every 1/10 of a second. While this would in theory would require a 33-bit accumulator to accommodate the answer, it is acceptable to truncate a couple of bits to fit the numbers into standard 32-bit arithmetic format. The summation process for each particular range bin provides 57 dB of SNR improvement. More importantly the process accommodates the huge dynamic range required to preserve targets in the presence of clutter.

The meaning of contra-directional and co-directional coupling is illustrated in FIGS. 4 to 6. These figures show only the most relevant modes of coupling. While all three modes exist simultaneously, it is easier to examine them one at a time.

Contra-directional coupling is illustrated in FIG. 4. The forward coupled energy denoted by 7 propagates in the forward direction down transmission line 1B to illuminate the intruder target. The energy reflected by the target, shown at 7' enters transmission line 1A and returns to end O of sensor cable 1. The RX signal 6 is a combination of the clutter returned all along the cable and from lead-out terminal 2 in the absence of an intruder. The reverse-propagating signal 7' created by the intruders presence is called the contra-directionally coupled target signal. The delay between the onset of the transmitted TX signal 5 and the receipt of the contra-directionally coupled target signal 7' reflected from the intruder is determined in this case by two factors.

The first and most dominant factor is the time delay caused by the propagation of the TX and RX signals inside transmission lines 1A and 1B. The contribution of the target signal in the RX signal varies in proportion to the range R due to the attenuation in transmission lines 1A and 1B.

The second factor, which has been ignored previously, is the transit time related to the radial range Z. The external fields surrounding cable 1 resemble a surface wave in which the time delay with radial distance Z is a complex function of the internal and external velocities of propagation. While there are many learned papers describing this time delay as a function of Z, it is sufficient for the purposes of the present specification to acknowledge that there is a time delay associated with radial range Z. With traditional contra-directionally coupled leaky coaxial cable sensors, the time delay due to radial range Z is very small compared to range R and is ignored, as it is impossible to differentiate one from the other.

Termination lead-out 2 plays an important role in retrieving the co-directionally coupled components in the response signal, as seen in FIGS. 5 and 6. Relevant here is its role as a time delayed reflector of the forward signals propagating in leaky cable 1B, obtained by an impedance mismatch designed to provide a reflected signal that is significant. As indicated above, the termination lead-out 2 must provide sufficient time delay to clearly distinguish between a contra-directionally coupled target at the end E of leaky cable 1, and a reflection from the mismatched termination.

FIG. 5 illustrates forward co-directional coupling. The TX signal 5 propagates inside transmission lines 1B to illuminate the intruder as illustrated by path 8. Presence of an intruder disturbs the electromagnetic field around cable 1 and the forward coupling is modified as illustrated by 8'. This change propagates in cable 1A, is partially reflected from mismatch termination 2A and propagates in the reverse direction back to amplifier 11 as shown by component 8". The target response component 8" is part of the RX signal 6. The word "forward" is used to indicate the direction of the reflection 8' caused by the intruder.

Reverse co-directional coupling is illustrated in FIG. 6. The TX signal 5 propagates inside transmission lines 1B and 2B, to be partially reflected from mismatch provided by lead-out 2B, and the RX signal propagates in the reverse direction along leaky transmission line 1B where it illuminates the intruder, as shown at 9. The intruders presence also generates a signal that propagates in the transmission line 1A in the reverse direction, as shown at 9', and continues to propagate to amplifier 11 as part of the RX signal.

There are other coupled target responses other than those shown in FIGS. 4, 5 and 6, but the coupling levels are considerably less than that of the forward and reverse co-directional coupling shown in FIGS. 5 and 6 and hence these can be ignored.

Provided that the delay properties of termination lines 2A and 2B are the same, and the propagation velocities in transmission lines 1A and 1B are the same, the energy reflected in the forward and reverse co-directional coupling illustrated in FIGS. 5 and 6 are identical due to reciprocity. Unlike the case of a contra-directional coupling, the combined co-directional coupled signals 8" and 9' are not a function of target range R. This is because the path length of the target signal remains the same regardless of the target position along the length of leaky cable sensor 1. On the other hand, the combined co-directional signal is delayed due to the radial range Z.

As indicated above, the first 37 range bins provide the contra-directionally coupled response for the 400 meters of active cable, while range bins 38, 39 and 40 provide the co-directionally coupled response from the end of the cable. Target responses in range bin 1 and part of range bin 2 are ignored since these correspond to lead-in cable.

The co-directionally coupled response appearing in range bins 38, 39 and 40 provide a measure of the radial range from the cable to the target. The actual relationship between the time delay and the radial range is very complex as it depends on the relative velocities of propagation both inside and outside of transmission lines 1A and 1B. Regardless of this complexity, the delay increases monotonically with radial range Z, which means that the delay can be used to measure the radial range of the target.

The delay of the co-directional response can be measured in time and/or as phase delay at the carrier frequency. The reflection from the termination lead-out 2 appearing in range bins 38, 39 and 40 can be linearly interpolated to determine the location of the end of the cable in the absence of targets. This location information is then used to eliminate targets that have too much delay as would be indicative of a large target outside the desired detection zone around the cable.

Figure 7:
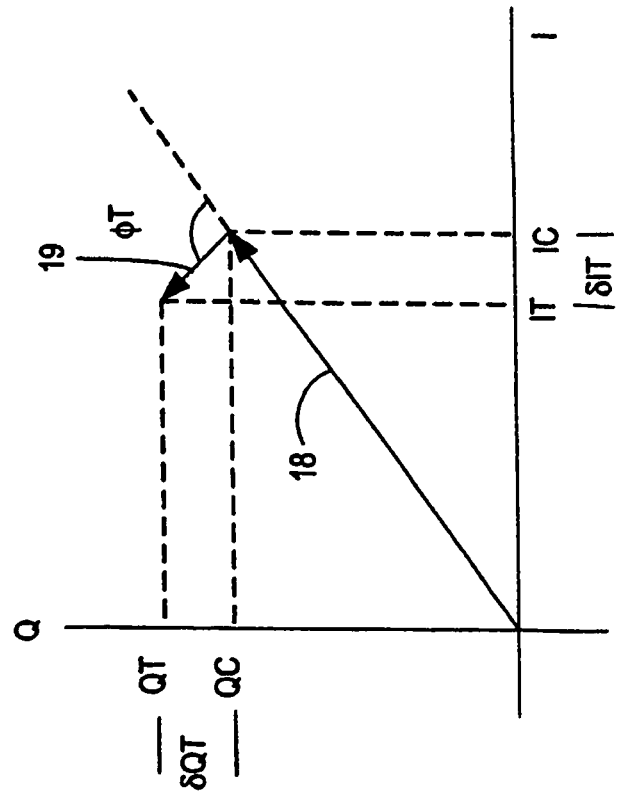
FIG. 7 is a polar plot illustrating the phase relationship of the co-directional coupling signal to an unperturbed RX signal.

The mechanism for desensitizing sensor cable 1 from its immediate surroundings illustrated in FIG. 7 is based on phase information. The axes of the polar plot are the in-phase sample I, and the quadrature-phase sample Q, relating to the co-directional coupling as measured in a range bin associated with the co-directional coupling (bins 38, 39, 40 in the example used in this specification). The co-directional clutter 18 is dominated by the immediate surroundings of sensor cable 1. As indicated above, this is due to the very rapid radial decay of the electromagnetic fields surrounding cable 1. The co-directional clutter 18 corresponds to the shortest possible path for the TX signal to get from transmit amplifier 10 to the reflective lead-out termination 2 and back to receive amplifier 11. Since intruders are detected at some distance Z from sensor cable 1, reflection 19 (see 8" and 9' on FIGS. 5 and 6 respectively) is delayed from the clutter. While this delay could be measured in time, it is quite small and can more easily be measured in phase as illustrated in FIG. 7.

The relative magnitude of the co-directional clutter 18 to the target response 19 has been exaggerated in FIG. 7. In general, an incremental (co-directional) target response 19 is very small ($1/10$ to $1/1000$) compared to the co-directional clutter 18. The phase of the clutter is defined by the in-phase clutter term IC and quadrature-phase clutter term QC; in practice it depends upon the length of cable 1 and termination lead-out 2. The phase $\Phi T$ of the incremental target response is determined by the incremental in-phase and quadrature-phase variations $\delta IT$ and $\delta QT$ introduced by the target response 19 in the RX signal. A point target on the surface of the cable would have an incremental target phase of zero; i.e. it would be in-phase with the clutter. The phase of the incremental target response increases as the target moves away from the cable. In practice it has been found that a human intruder at a radial range Z of 1 to 2 meters has an incremental phase angle of about 90 degrees.

Figure 8:
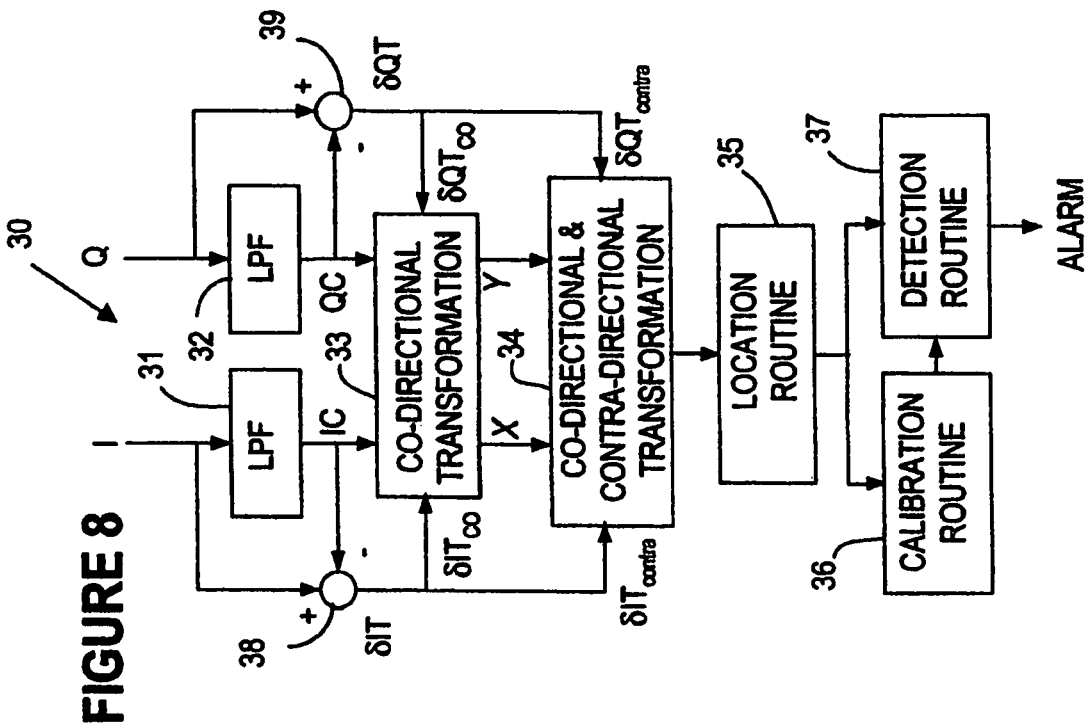
FIG. 8 provides an overview of the digital signal processing performed to detect and locate an intruder along the length of the sensor cable.

The operations performed by unit 30 on components I and Q are outlined in FIG. 8. Unit 30 includes digital low pass filters 31 and 32, a co-directional transformation routine 33, co-directional and contra-directional transformation routine 34, a location routine 35, calibration routine 36, and a detection routine 37.

First, the I and Q components for each of the 40 range bins are passed through digital low pass filters 31 and 32 to estimate the clutter in-phase and quadrature-phase terms IC and QC for each of the range bins. The frequency response of these low pass filters is selected so as to track environmental changes but not follow the intruder response. The IC and QC clutter terms for the co-directional range bin 39 are passed to a co-directional transformation routine 33.

The IC and QC clutter terms for each of the range bins are subtracted from the I and Q components to determine the incremental $\delta IT$ and $\delta QT$ of the target responses for both the contra-directionally coupled and co-directionally coupled data, as shown at 38 and respectively 39.

The co-directional clutter and incremental target response in range bin 39, $IT_{co}$, $QT_{co}$, $\delta IT_{co}$ and $\delta QT_{co}$, are also passed to co-directional transformation routine 33. In this routine, the incremental target response is transformed into an X and a Y response, where X is in phase with the co-directional clutter and Y is in quadrature to the co-directional clutter. The transformation equations are:

$$X = \frac{\delta IT \cdot IC + \delta QT \cdot QC}{\sqrt{IC^2 + QC^2}}$$

which is equivalent to $MT\cos(\Phi T)$ and $$Y = \frac{\delta QT \cdot IC + \delta IT \cdot QC}{\sqrt{IC^2 + QC^2}}$$

which is equivalent to $MT\sin(\Phi T)$

The angle $\Phi T$ is as shown in FIG. 7, and the target magnitude, MT, is equal to $MT=\sqrt{\delta IT^2+\delta QT^2}$ where $\delta IT$ and $\delta QT$ are as illustrated in FIG. 7.

The subscripts "co" have been omitted in the forgoing equations for simplicity but it is assumed that these are the parameters from the bin or the range bin associated with the reflection from the termination lead-out 2 in cases where shorter cables are used.

The angle $\phi T$ increases with radial range Z. Since the clutter comes from the shortest path from O to F (no intruder present), negative angles should not occur, as the path from O to the target and on to F is always larger than the direct path from O to F. The exact relationship between Z and $\phi T$ is very complex but as the target moves away from the cable Z increases and the angle $\phi T$ increases. As the field strength decays rapidly from the cable we are primarily interested in targets where $0 > \phi T > 180°$, which experimental data shows corresponds to values of Z out to 3 to 4 meters at which range the response is extremely small. This means that Y, which depends on $\sin(\phi T)$ provides an ideal means of desensitizing the cable to changes at the surface of the cable, while detecting targets with full magnitude when $\phi T=90°$. For targets with $180 > \phi T > 360°$, Y is negative and can be used to desensitize the cable beyond the desired detection zone.

While phase angle may be used to measure the small time delay associated with targets in the desired detection zone of 2 to 3 meters from the cable, there is an ambiguity in the phase measurement when $\phi T > 180°$. This is why amplitude interpolation is used to eliminate such responses.

The Y response computed by co-directional routine 33 is correlated with the contra-directionally coupled responses by a co-directional and contra-directional transformation routine 34. Taking the product of Y with the contra directional magnitude desensitizes to changes that occur on the surface of cable 1. Another benefit of the desensitization by the Y response is that the detection zone cross section for cable 1 (with the two transmission lines in the same jacket) is increased.

For a single target, this correlation process is straight forward since both the co-directional and the contra-directional responses will respond simultaneously. When there are multiple simultaneous targets, the Y response corresponds to a composite of all the targets and the end result is that the output of the routine 34 may be larger than it should be for each individual target. This situation does not introduce a vulnerability leading to not detecting intruders, which is critical in a security system. In the worst case, this can create an alarm for a smaller target than may otherwise occur.

The outputs of correlator 34 for range bins 1 through 37 are passed to a location routine 35. The contra-directionally coupled incremental responses in the first 19 range bins are processed to locate responses along the length of sensor cable 1. Since the chip length is equal to two range bins, the response to a point target occurs in three consecutive range bins, with the target being in the range bin of peak amplitude. Linear interpolation among the three consecutive range bins is used to generally locate the target.

Figure 9:
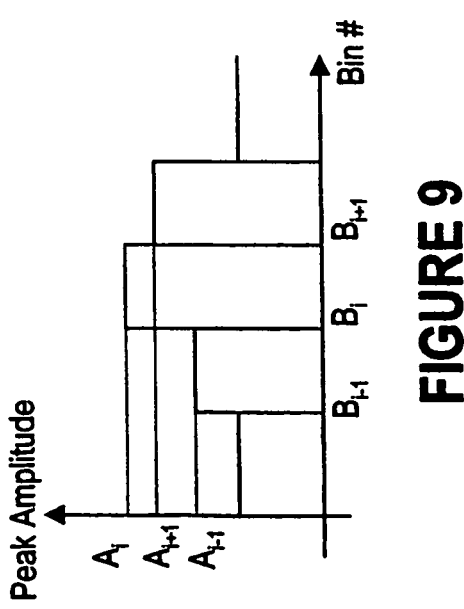
FIGS. 9 and 10 show operation of the location routine of FIG. 8, where

FIG. 9 shows three consecutive bins with greater amplitudes than the neighbouring bins. The first step performed by the location routine 35 is to find all the local peaks in the amplitude response of the range bins. The amplitude is derived by taking the square root of the sum of the squares of the in-phase I and quadrature-phase Q components. A local peak is defined as a range bin with a larger amplitude than its neighbouring range bins, as shown at $A_i$. If there is a target in the proximity of three adjacent bins $B_{i-1}$, $B_i$ and $B_{i+1}$, this is located in bin $B_i$ that has the largest amplitude ($A_{i-1} < A_i > A_{i+1}$).

Figure 10:
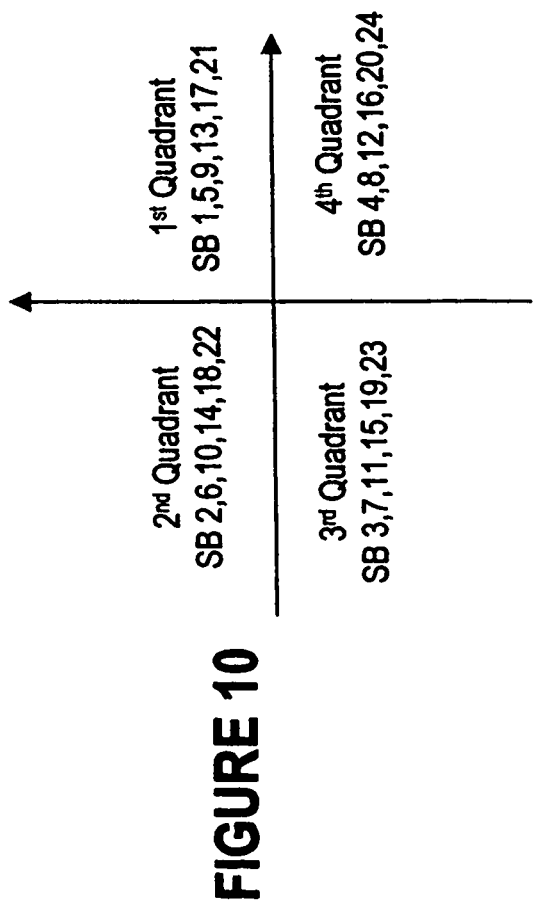

Once the target is generally located using the interpolation of range bin data, the location routine 35 examines the I and Q components of the response to locate the target within a sub-bin corresponding to a phase quadrant. There are 24 sub-bins in each range bin, as illustrated in FIG. 10. Each sub-bin corresponds to a quadrant in the plane defined by the I and Q components, resulting in n (number of cycles in a chip) possible sub-bins associated with each phase quadrant; n=6 for the example described in this specification.

The location routine 35 resolves the sub-bin ambiguity associated with the cycle count within the range bin using the ratio of the neighbouring range bin amplitudes to resolve the number of phase cycles. The range bin ratios associated with responses with a phase angle of 180 degrees (on the I axis on the I-Q plot of FIG. 7) are listed in Table 1.

TABLE 1

| Cycle | Ratio | Sub-bin |
| --- | --- | --- |
| 1 | 0.19 | 1, 2, 3, 4 |
| 2 | 0.38 | 5, 6, 7, 8 |
| 3 | 0.72 | 9, 10, 11, 12 |

TABLE 1-continued

| Cycle | Ratio | Sub-bin |
| --- | --- | --- |
| 4 | 1.39 | 13, 14, 15, 16 |
| 5 | 2.67 | 17, 18, 19, 20 |
| 6 | 5.39 | 21, 22, 23, 24 |

The location routine identifies the response location as the sub-bin listed in FIG. 10 within the quadrant that has the response ratio closest to those shown in Table 1.

Once the sub-bin location has been identified, the amplitude of the peak response is compared in a detection routine 37 with a stored threshold for that sub-bin to determine if a target should be declared. At the carrier frequency of 31.25 MHz and a relative cable velocity of 81%, a 90° of phase rotation corresponds to 0.97 meters of cable. Thus, in the preferred embodiment of the invention, each sub-bin corresponds to 0.97 meters of cable length, which means there are 412 thresholds for a 400-meter length of sensor as opposed to one threshold in the traditional CW leaky coaxial cable sensors.

The location routine output information is used by a calibration routine 36. When the sensor is first installed, a person walks along the length of the sensor cable 1 at a uniform distance from the cable and the response is recorded for each sub-bin in calibration routine 36. This calibrated response is used as the basis for setting the thresholds used in detection routine 37.

The calibration process sets a separate threshold for every 0.97 meter length of sensor cable that takes into account the cable attenuation and any other installation variations such as cable burial depth or in the electrical properties of the surface of the terrain. This makes the probability of detecting a person crossing over the cable much more uniform along the length of the cable. The another way, the detection zone is much more uniform in dimensions due to the use of multiple calibrated thresholds.

During normal operation, the precise target location information derived in location routine 35 is used in the detection routine 37 with a separate calibrated threshold being used for each sub-bin. When the correlated response computed in contra-directional and co-directional correlator 34 exceeds the threshold an alarm is declared. This process detects multiple simultaneous intrusions.

As an alternative to the direct use of the Y factor and its sine function desensitization one can utilize the ratio Y/X. This replaces the sine function compensation with tangent function compensation. In this case, the infinite amplitude of the function as the angle approaches 90° needs to be bounded so as not to introduce false alarms due to noise.

Eliminating target responses from the lead-in cable using the ranging capability of the sensor has the very distinct advantage of eliminating the need for non-leaky lead-in cable. Such lead-in cable adds substantial cost to the existing CW products due to the addition of numerous connectors. More importantly, the reduction in the number of connectors in the cable improves the reliability of the product.

In practice, terminators 2A and 2B are attached to the end of the leaky cables 1A and 1B in the factory. This also significantly improves the reliability of the product. In some applications where cable lengths of less than 400 meters are required, the cable is shortened from end 0 leaving the factory-installed terminators in place. From a signal processing point of view, the length of code, the number of range bins and the processing rate are kept the same for these shorter cables to simplify the task of the installer. In this case however, the termination 2 will appear in other than range bin 39, but this can be detected and adjusted automatically.

In practice, it is often desirable to have two sensor cables per processor to amortize the cost over a longer length of perimeter. It is possible to create orthogonal complementary codes in order to process both cables simultaneously.

As with other leaky coaxial cable sensors, it is possible to provide power and data over the sensor cable. The terminating lead-out cable of one cable is connected to the terminating lead-out of the next sensor, and filtering circuitry is used to provide the desired mismatch termination while passing the power and data from one processor to the next.

The co-directional clutter depends upon the mismatch loads at the end of the terminating lead-out 2A and 2B. In addition to providing the reference phase for the co-directional target, sensing this clutter is used to supervise the sensor line. Should anyone cut the line a significant change in the co-directional clutter will result. A Tamper alarm is declared when a significant change in the co-directional clutter is detected.

There are a number of cable designs that incorporate two leaky transmission lines into one jacket that can be used with the present invention. The precise location feature of the present invention avoids the use of expensive graded leaky cables. When used as a rapidly deployable sensor it is important to select a cable that is light and flexible so that it can adapt to the surface of the terrain with minimal environmental induced motion. The desensitizing achieved by the combined co-directional and contra-directional coupling is a major factor in making rapid deployment a reality.

Figure 11:
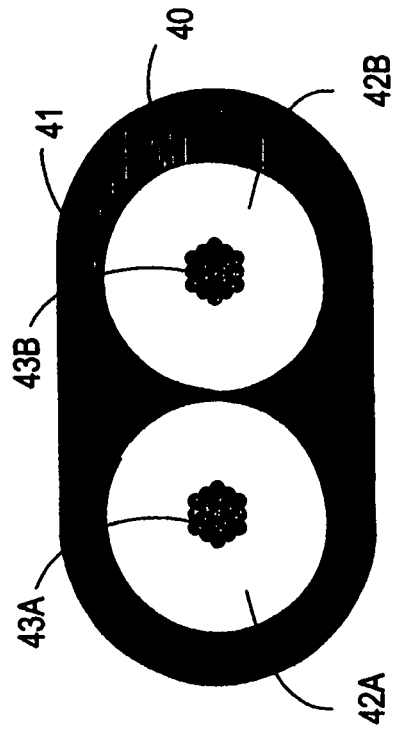
FIG. 11 presents a cross-section of a sensor cable according to the embodiment of FIG. 1.

A cable design suitable for use with the present invention is illustrated in FIG. 11. Transmission line 1A comprises center conductor 43A, dielectric core 42A and a common outer conductor 41. Transmission line 1B comprises center conductor 43B, dielectric core 42B and the common outer conductor 41. As discussed above, the velocity of the signals propagating along the transmission lines 1A and 1B depends upon the relative permittivity of the dielectric material. In the preferred embodiment, cellular polyethylene cores 42A and 42B are used which establishes a propagation velocity of 81% of the velocity of light in free space.

The complete cable structure 1 is encased in jacket 40. Common outer conductor 41 partially surrounds both transmission line 1A and transmission line 1B. Since the outer conductor 41 provides only partial coverage of the dielectric cores, it creates longitudinal slots through which the electromagnetic fields couple.

It is desirable to make the cable 1 as flexible as possible. Center conductor 43A and 43B are made preferably from 19 stranded tinned copper wires. The outer conductor 41 is a flat tinned copper braid. The jacket material is selected to be as pliable as possible in outdoor applications. As a result the cable is easily deployed on most terrains.

The fact that outer conductor 41 is in common with both transmission lines 1A and 1B ensures that there cannot be any two-wire line mode supported by the outer conductors of the two transmission lines. This removes the need for conductive plastic jackets or to place the outer conductors in electrical contact with each other in a common jacket.

In the alternative, a composite foil shielding tape can be used as outer conductor 41 with a parallel braided drain wire to facilitate connections. The fact that the tape is of constant width significantly reduces the cost of cable compared to a graded cable where the foil width is tapered to account for cable attenuation.

Since the main purpose of the terminating lead-out 2 is to provide a time delay, attenuation is not a critical factor. This means that a much smaller diameter coaxial cable with a high dielectric core such as high-density polyethylene can be used. The terminating lead-out must provide sufficient time delay to clearly distinguish between a contra-directionally coupled target at the end of leaky cable 1 and the reflection from the mismatched termination.

While the present invention represents a sensor system, which utilizes a single cable comprising two leaky coaxial transmission lines, the system can easily be adapted for use with two separate cables. In covert application where the cables are buried in the terrain it may be beneficial to bury two parallel cables. In this case the cable spacing can be tailored to provide the desired detection zone width. The calibration process with its multiple thresholds would then take into account any variations in burial depth or cable spacing.

Figure 12:
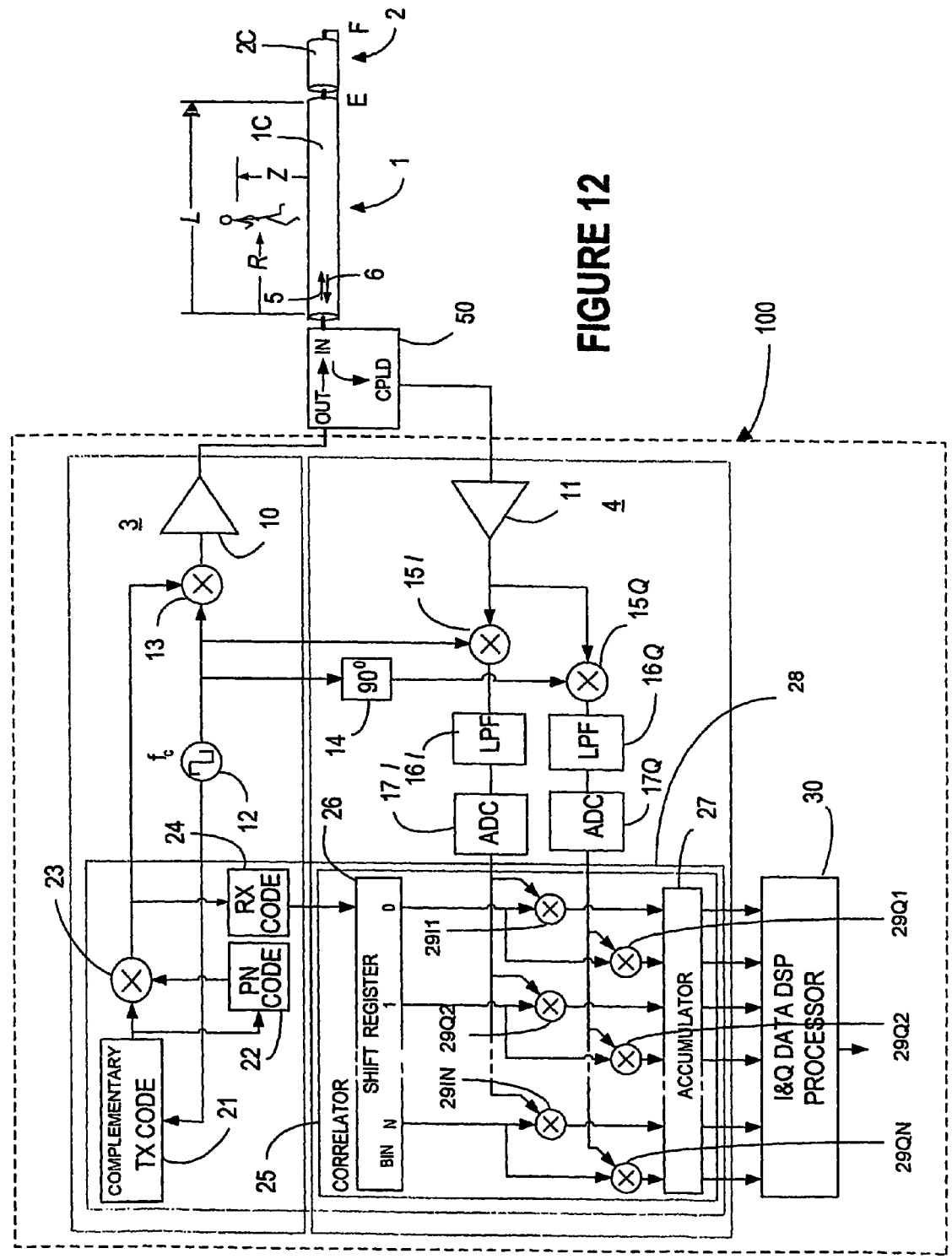
FIG. 12 is a block diagram of the intrusion detecting system with a sensor cable and directional coupler in accordance with a second embodiment of the present invention.

As previously mentioned, one of the important advantages of the present invention is a significant improvement in the dynamic range of the sensor system. With this improvement, it is now possible to utilize a practical single leaky coaxial cable sensor as shown in the detecting unit 4 of FIG. 12. The detecting unit 4 uses a conventional directional coupler 50 to separate the transmit and receive signals. The two parallel cables 1A and 1B shown previously in FIG. 1 are replaced with a single leaky coaxial cable 1C and a single lead-out cable 2C. The three ports of the directional coupler 50 are traditionally labeled "IN" for input, "OUT" for output and "CPLD" for coupled. The transmit signal is applied to the output port, the cable is connected to the input port and the receive signal is retrieved from the coupled port. A typical directional coupler that can be used in this application is the Model TDC-6-1 which has a through loss of 6 dB and directivity of 45 dB at the desired 31.25 MHz frequency of operation. Although the clutter to target ratio is increased relative to the parallel cable embodiment, the dynamic range of the ultra high speed correlator is capable of accommodating the clutter and target. The stability of the digital signal processing techniques used in the ultra high speed correlator is also an integral part of providing a practical single cable sensor system.

Figure 13:
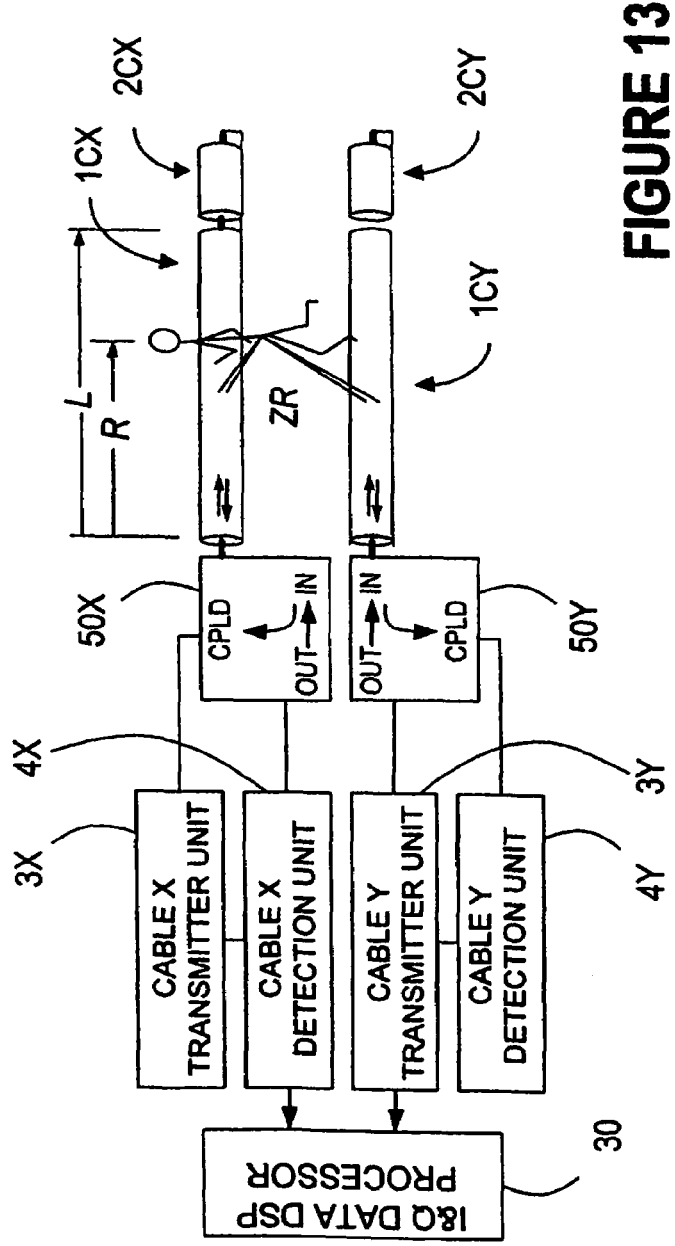
FIG. 13 is a block diagram of a stereo cable guided radar sensor comprising two one cable sensor in parallel according to a third embodiment of the present invention.

FIG. 13 is a block diagram of a stereo cable guided radar sensor system comprising two one cable sensors in parallel according to a third embodiment of the present invention. As shown in FIG. 13, the system comprises two transmitter units 3X and 3Y, two cable detection units 4X and 4Y, two directional couplers 50X and 50Y, two cables 1CX and 1CY, the termination 2C, which are operatively coupled with a single I&Q Data DSP Processor 30 to create a stereo cable guided radar. In FIG. 13, one cable and associated equipment has suffix X and the other the suffix Y. Cables 1CX and 1CY and their respective transmitting and detective units are processed separately by the I&Q Data DSP Processor 30. Cables 1CX and 1CY are laid on the surface of the terrain parallel and approximately 5 feet from each other, along the perimeter to be protected. Cables 1CX and 1CY are terminated in lead-out sections 2CX and 2CY respectively. When an intruder crosses over the two cables typical magnitude responses 40X and 40Y are created such as that shown in FIG. 10. In the situation shown in FIG. 14 the intruder crosses cable 1CX and then cable 1CY thereby indicating the direction of crossing is from X to Y systems respectively.

Processor 30 is capable of correlating the two responses detected from both cables 1CX and 1CY respectively. To be recognized as an intruder the responses must be at the same range and be seen by both cables at the same time. Moreover, the intruder must progress across the two cables in a logical manner. Intruders that cross at right angles to the cables have the same range on both cables. Intruders that cross at an angle must create responses that track each other in range. In other words, the along cable motion as measured by the phase response on the two cables must correlate. This simple but very demanding detection criterion eliminates noise created by cable motion with or without the use of the co-directional response described previously.

Processor 30 determines the velocity of the intruder from the timing of responses 40X and 40Y and the range information derived from the phase responses on the two cables. This information can be used to effectively track an intruder moving in proximity to the cables. This tracking information is terms of the ratio ZR of the radial distances from the two cables. Such tracking information can be used to guide CCTV assessment cameras and provide a more effective tactical response to the intrusion.

Figure 14:
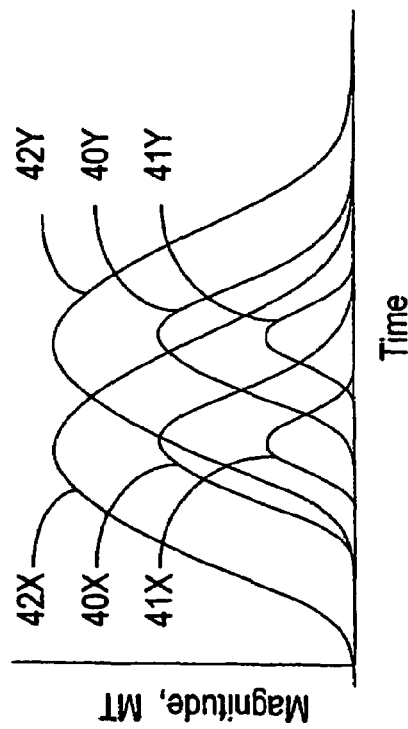
FIG. 14 is a sample magnitude response plot for three different size targets that illustrates the tracking and classification of targets according to the third embodiment of FIG. 13.

FIG. 14 is a sample magnitude response plot for three different size targets that illustrates the tracking and classification of targets peformed by the processor 30 according to the third embodiment of FIG. 13. When a very small target such as a rabbit crosses the cables the responses will be much smaller in magnitude and more separated in time as illustrated in FIG. 14 as 41X and 41Y. When a very large target such as a car or truck crosses the cables the responses will be much larger and less separated in time as illustrated in FIG. 14 as 42X and 42Y. The processor is programmed to distinguish between these types of responses and thereby classify the type of target. The velocity is an integral part in classifying the target.

There are a couple of other considerations when implementing the stereo cable guided radar. For instance, the foregoing description does not account for the fact that the range to the target will be different if the cable pair goes around a corner or the velocity of propagation is different within the two cables. In addition, the sensitivity of the two cables may differ from each other along the length of the cables due to the way the cables are positioned on the ground and the properties of the ground. However, these specific cases are accommodated during the calibration process. The system records the response from each cable for a person walking between the cables along their entire length of the cables. The sensitivity to the person is recorded as described previously and in addition a correlation table is created that relates one cables location data to that of the other. The range correlation data is used in the processing of the stereo cable guided radar data to implement the foregoing detection routine.

In practice, most processors are built with the capability of doing the stereo cable detection process described in FIG. 13. In some applications the two cables are buried in opposite directions from the processor to provide two lengths of single cable operation. In other applications the two cables are run parallel to each other to provide stereo operation.

The additional benefits derived from the tracking and classification capability of stereo cable guided radar are significant in the development of the art.

To the owners of existing parallel leaky cable sensors, the processors can be exchanged for the stereo cable guided radar processor and the new system elements are available with old cables. Not only does this add new features but it also improves the normal detection performance in terms of reduced false and nuisance alarms.

For customers that require rapid deployment, they can simply lay the cable on the surface by either exploiting the stereo option or the co-directional with contra-directional option or both. Those who require a more covert sensor may simply slip the cables below the surface much like a telephone cable. With location capability and the associated calibrated thresholds the restriction on cable depth and spacing are removed thereby lowering the cost of installation.

A person understanding this invention may conceive of alternative embodiments based on the general concepts taught. All such embodiments are considered within the scope of the present invention.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method for detection and location of a target crossing into an area defined by a sensor cable, comprising:
   generating a TX signal and transmitting same over a first transmission line of the sensor cable, for creating an electromagnetic field;
   detecting an RX signal induced in a second transmission line of the cable by the electromagnetic field and identifying in the RX signal a contra-directional reflection received from a target and a co-directional reflection received from the far-end (F) of the first transmission line; and
   processing the contra-directional reflection for providing a first coordinate (R) of the target, and processing the co-directional reflection for providing a second coordinate (Z) of the target.

2. The method as claimed in claim 1, wherein the TX signal is comprised of successive coded pulse sequences selected to achieve a thumbtack correlation in the RX signal at a plurality of points along the sensor cable, defined as range bins B.

3. The method as claimed in claim 1, wherein the TX signal is a coded pulse sequence comprising a phase-coded pulse of m chips, a first p-chip long logic "0", a complement of the phase-coded pulse, and a second p-chip long logic "0" modulated over a carrier signal of frequency fc in the HF/VHF transmission band, a chip having a duration of n synchronous cycles of the fc.

4. The method as claimed in claim 3, wherein the step of detecting comprises digitizing the RX signal at twice the chip rate for the duration M=2(m+p) of one coded pulse sequence.

5. The method as claimed in claim 2, wherein the second coordinate Z is obtained from a target location signal detected in a range bin at the far-end (F), to provide a measure of the co-directional reflection.

6. The method as claimed in claim 2, wherein the first coordinate R is derived from a target location signal detected in all range bins along the sensor cable, to provide a measure of the contra-directional reflection.

7. The method as claimed in claim 3, wherein the sample rate is half the pulse width to ensure that a target location signal is detected in three consecutive range bins.

8. The method as claimed in claim 3, wherein the step of processing comprises:
   detecting a target location signal in three consecutive range bins;
   linearly interpolating the amplitude of the target location signal over the three range bins for identifying the general location of the target within the range bin;
   within the target bin, determining a group of target sub-bins based on the phase difference $\Delta 101$ of the target location signal with respect to the TX signal; and
   within the group of target sub-bins, determining a target sub-bin based on the relative phase angle $\Delta \Phi$.

9. The method as claimed in claim 8, further comprising providing a threshold for each range sub-bin and calibrating the thresholds to distinguish a target's presence from environmental changes on the surface of the sensor cable.

10. The method as claimed in claim 1, wherein the step of processing the co-directional reflection comprises determining an end range bin where the co-directional reflection is generated in the absence of a target and measuring a reference co-directional clutter generated in the end range bin.

11. The method as claimed in claim 10, wherein the step of processing the co-directional reflection further comprises measuring a target co-directional clutter generated in the end range bin; and comparing the target co-directional clutter with the reference co-directional clutter for determining the second coordinate Z of the target.

12. An intrusion detection sensor comprising:
   means for generating a TX signal and transmitting same over a first open transmission line, for creating an electromagnetic field;
   means for converting an RX signal induced in a second open transmission line by the electromagnetic field into an in-phase (I) component and quadrature-phase (Q) component for each of a plurality of range bins B corresponding to a respective linear distance R;
   means for processing the I and Q components for each range bin for detecting a target and specifying coordinates R and Z of the target,
   wherein R is a linear distance along the first transmission line and Z is a radial distance from the first transmission line.

13. The sensor as claimed in claim 12, wherein the means for generating comprises:
   a TX code generator for generating a coded pulse sequence comprising a phase-coded pulse of m chips, a first p-chip long logic "0", a complement of the phase-coded pulse, and a second p-chip long logic "0";
   a pseudo-noise generator for mixing the coded pulse sequence with a pseudo-noise signal for uniformly spreading the spectrum of the coded pulse sequence; and
   means for modulating the coded pulse sequence over the carrier signal to obtain the TX signal.

14. The sensor as claimed in claim 13, wherein the means for converting comprises:
   means for synchronously detecting an in-phase (I) sample and a quadrature-phase (Q) sample of the RX signal;
   a RX code generator for generating a synchronous version of the coded pulse sequence, with a chip rate twice the chip rate of the TX signal;
   means for accumulating B consecutive I samples and Q samples, while demodulating the pseudo-noise code from each sample and for simultaneously correlating the version of the coded pulse sequence with each of the I and Q samples, respectively, for creating the I component and Q component, wherein each of the I and Q sample is time stamped to specify a range bin B.

15. The sensor as claimed in claim 14, wherein the means for synchronously detecting comprises:
   a first and a second mixer for combining the carrier signal and a quadrature version of the carrier signal with the RX signal and providing an in-phase and a quadrature-phase demodulated version of the RX signal, respectively; and
   a first and a second analog to digital converter for sampling the in-phase and the quadrature-phase demodulated version of the RX signal, respectively for obtaining the I sample and the Q sample.

16. The sensor as claimed in claim 12, wherein the means for processing comprises:
   means for filtering the I component and the Q component for obtaining a clutter in-phase term IC and a clutter quadrature-phase term QC, respectively;
   means for subtracting the IC term and the QC term form the I component and the Q component respectively for obtaining an in-phase incremental variation in magnitude ($\delta IT$) and a quadrature-phase incremental variation in magnitude ($\delta QT$) introduced by a target response in the RX signal;
   first calculating means for receiving the IC and QC terms and the incremental variations $\delta IT$ and $\delta QT$ and calculating a X response in phase with a co-directional clutter and a Y response in quadrature with the co-direction at clutter for a range bin where the co-directional clutter is generated; and
   second calculating means for receiving the X and Y responses and the incremental variations $\delta IT$ and $\delta QT$ and calculating a target location signal for all range bins where the contra-directional clutter is generated.

17. The sensor as claimed in claim 16, wherein the means for processing further comprises target location means for detecting a local peak in the target signal, and generating a target sub-bin signal identifying a target bin and a target sub-bin associated with the local peak.

18. The sensor as claimed in claim 17, wherein the means for processing further comprises detection means for specifying the coordinates R and Z of the target whenever the target sub-bin signal exceeds a threshold corresponding to the target sub-bin.

19. The sensor as claimed in claim 17, wherein the means for processing further comprises calibration means for determining a threshold for each range sub-bin.

20. A method for detection and location of a target crossing into an area defined by a sensor cable, comprising:
   generating a TX signal and transmitting same over a transmission line of the sensor cable, for creating an electromagnetic field;
   receiving a coupled signal in the transmission line and separating an RX signal from the coupled signal in the transmission line caused by the target disturbing the electromagnetic field;
   detecting the RX signal and identifying in the RX signal a contra-directional reflection received from the location of the target; and
   processing the contra-directional reflection for providing a range of the target.

21. The method as claimed in claim 20, wherein said TX signal is a coded pulse sequence comprising a phase-coded pulse of m chips, a first p-chip long logic "0", a complement of said phase-coded pulse, and a second p-chip long logic "0" modulated over a carrier signal of frequency fc in the HF/VHF transmission band, a chip having a duration of n synchronous cycles of said fc.

22. The method as claimed in claim 21, wherein the step of detecting comprises digitizing said RX signal at twice the chip rate for the duration M=2(m+p) of one coded pulse.

23. A method for detection and location of a target crossing into an area defined by a sensor cable, comprising:
   generating a first TX signal and transmitting the first TX signal over a first transmission line of the sensor cable and simultaneously generating a second TX signal and transmitting the second TX signal over a second transmission line of the sensor cable, for creating an electromagnetic field;

receiving a first coupled signal corresponding to the first TX signal in the first transmission line and separating a first RX signal from the first coupled signal in the first transmission line caused by the target disturbing the electromagnetic field, and simultaneously receiving a second coupled signal corresponding to the second TX signal in the second transmission line and separating a second RX signal from the second coupled signal in the second transmission line caused by the target disturbing the electromagnetic field;

detecting the first RX signal and identifying in the first RX signal a first contra-directional reflection received from the location of the target, and simultaneously detecting the second RX signal and identifying in the second RX signal a second contra-directional reflection received from the location of the target;

correlating the first and the second contra-directional reflection; and processing the correlated first and second contra-directional reflection to provide a range of the target.

24. The method as claimed in claim 23, wherein the first TX signal is a coded pulse sequence comprising a phase-coded pulse of m chips, a first p-chip long logic "0", a complement of the phase-coded pulse, and a second p-chip long logic "0" modulated over a carrier signal of frequency fc in the HF/VHF transmission band, a chip having a duration of n synchronous cycles of the fc; and wherein the second TX signal is a coded pulse sequence comprising a phase-coded pulse of m chips, a first p-chip long logic "0", a complement of the phase-coded pulse, and a second p-chip long logic "0" modulated over a carrier signal of frequency fc in the HF/VHF transmission band, a chip having a duration of n synchronous cycles of the fc.

25. The method as claimed in claim 24, wherein the step of detecting the first RX signal comprises digitizing the first RX signal at twice the chip rate for the duration M=2(m+p) of one coded pulse sequence, and wherein the step of detecting the second RX signal comprises digitizing the second RX signal at twice the chip rate for the duration M=2(m+p) of one coded pulse sequence.

* * * * *

UNITED STATES PATENT AND TRADEMARK OFFICE
CERTIFICATE OF CORRECTION

PATENT NO. : 7,576,648 B2  Page 1 of 1
APPLICATION NO. : 10/566895
DATED : August 18, 2009
INVENTOR(S) : Robert Keith Harman It is certified that error appears in the above-identified patent and that said Letters Patent is hereby corrected as shown below:

IN THE CLAIMS

In Column 24, Line 64, in Claim 8, after "based on the phase difference", insert --$\Delta\Phi$--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,576,648 B2
APPLICATION NO. : 10/566895
DATED : August 18, 2009
INVENTOR(S) : Robert Keith Harman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Seventh Day of September, 2010

David J. Kappos
*Director of the United States Patent and Trademark Office*